(12) United States Patent
Park et al.

(10) Patent No.: US 10,531,003 B2
(45) Date of Patent: *Jan. 7, 2020

(54) LENS MOVING APPARATUS, CAMERA MODULE AND MOBILE DEVICE INCLUDING THE SAME

(71) Applicant: LG INNOTEK CO., LTD., Seoul (KR)

(72) Inventors: Tae Bong Park, Seoul (KR); Jin Suk Han, Seoul (KR); Jung Cheol Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/295,441

(22) Filed: Mar. 7, 2019

(65) Prior Publication Data

US 2019/0208128 A1 Jul. 4, 2019

Related U.S. Application Data

(63) Continuation of application No. 15/946,435, filed on Apr. 5, 2018, now Pat. No. 10,264,182, which is a (Continued)

(30) Foreign Application Priority Data

Mar. 19, 2015 (KR) .................. 10-2015-0037953
May 28, 2015 (KR) .................. 10-2015-0074759

(51) Int. Cl.
*H04N 5/232* (2006.01)
*G02B 7/04* (2006.01)
(Continued)

(52) U.S. Cl.
CPC ......... *H04N 5/23287* (2013.01); *G02B 7/023* (2013.01); *G02B 7/04* (2013.01);
(Continued)

(58) Field of Classification Search
CPC .......... H04N 5/23287; H04N 5/23267; H04N 5/23258; H04N 5/2257; H04N 5/2254;
(Continued)

(56) References Cited

U.S. PATENT DOCUMENTS 5,932,984 A 8/1999 Murakami et al.
2006/0028330 A1 2/2006 Gallant et al.
(Continued)

FOREIGN PATENT DOCUMENTS

EP 2 808 717 A2 12/2014
JP 2008-051927 A 3/2008
(Continued)

OTHER PUBLICATIONS

European Search Report dated Jul. 21, 2016 in European Application No. 16159592.1.
(Continued)

*Primary Examiner* — Lin Ye
*Assistant Examiner* — Chan T Nguyen
(74) *Attorney, Agent, or Firm* — Saliwanchik, Lloyd & Eisenschenk

(57) ABSTRACT

Embodiments provide a lens moving apparatus including a bobbin having a lens barrel, a housing configured to accommodate the bobbin, an upper elastic member coupled to the bobbin and the housing, a lower elastic member coupled to the bobbin and the housing, a first coil disposed on the bobbin, a first magnet disposed on the housing, a circuit board disposed below the housing, a second coil disposed on the circuit board, a first sensor to output a first output signal based on a sensed result of a magnetic field strength of the first magnet, a first capacitor connected in parallel to the first sensor.

20 Claims, 27 Drawing Sheets

Related U.S. Application Data continuation of application No. 15/075,779, filed on Mar. 21, 2016, now Pat. No. 10,057,493.

(51) Int. Cl.
| | |
|---|---|
| *G02B 27/64* | (2006.01) |
| *G02B 7/02* | (2006.01) |
| *H04N 5/225* | (2006.01) |
| *G03B 3/10* | (2006.01) |
| *G03B 5/00* | (2006.01) |

(52) U.S. Cl.
CPC ............ *G02B 27/646* (2013.01); *G03B 3/10* (2013.01); *G03B 5/00* (2013.01); *H04N 5/2254* (2013.01); *H04N 5/2257* (2013.01); *H04N 5/23258* (2013.01); *H04N 5/23267* (2013.01); *G03B 2205/0069* (2013.01)

(58) Field of Classification Search
CPC .... G03B 5/00; G03B 3/10; G03B 2205/0069; G02B 7/023; G02B 27/646; G02B 7/04
USPC ....................................................... 348/208.7
See application file for complete search history.

(56) References Cited

U.S. PATENT DOCUMENTS

| | | |
|---|---|---|
| 2012/0229926 A1 | 9/2012 | Wade et al. |
| 2013/0016427 A1 | 1/2013 | Sugawara |
| 2017/0052387 A1* | 2/2017 | Yu ............................ G02B 7/04 |

FOREIGN PATENT DOCUMENTS

| | | |
|---|---|---|
| KR | 10-2009-0104428 A | 10/2009 |
| KR | 10-2009-0124318 A | 12/2009 |

OTHER PUBLICATIONS

Notice of Allowance dated Jan. 5, 2018 in U.S. Appl. No. 15/075,779.
Notice of Allowance dated Dec. 5, 2018 in U.S. Appl. No. 15/946,435.

\* cited by examiner

LENS MOVING APPARATUS, CAMERA MODULE AND MOBILE DEVICE INCLUDING THE SAME

CROSS-REFERENCE TO RELATED APPLICATIONS

This application is a continuation of U.S. application Ser. No. 15/946,435, filed Apr. 5, 2018; which is a continuation of U.S. application Ser. No. 15/075,779, filed Mar. 21, 2016, now U.S. Pat. No. 10,057,493, issued Aug. 21, 2018; which claims benefit under 35 U.S.C. § 119 to Korean Patent Application Nos. 10-2015-0037953, filed Mar. 19, 2015; and 10-2015-0074759, filed May 28, 2015; all of which are hereby incorporated by reference in their entirety.

TECHNICAL FIELD

Embodiments relate to a lens moving apparatus, a camera module and a mobile device each including the same.

BACKGROUND

Technology of a voice coil motor (VCM), which is used in existing general camera modules, is difficult to apply to a camera module for micro-scale and low power consumption, and study related thereto has been actively conducted.

In the case of a camera module configured to be mounted in a small electronic product, such as a smart phone, the camera module may frequently receive shock when in use, and may undergo fine shaking due to, for example, user hand tremor. In consideration of this fact, there is a demand for development related to technology of additionally installing a device for inhibiting hand tremor to a camera module.

In order to further improve the hand tremor compensation device, it is necessary to improve the structure of a lens moving apparatus that performs alignment of the optical axis focal distance of a lens in a camera module or a hand tremor compensation function.

In particular, when tilting occurs while the lens moving apparatus performs hand tremor compensation, auto-focusing and hand tremor compensation by the lens moving apparatus may be erroneous and the quality of captured images may be deteriorated. Therefore, there is a demand for prevention of tilting of the lens moving apparatus.

BRIEF SUMMARY

Embodiments provide a lens moving apparatus, which may restrict the effect of magnetic induction by a coil and may enhance the reliability of OIS control, and a camera module including the same. Embodiments provide a lens moving apparatus, which is configured to restrict the occurrence of excessive tilting of some constituent elements during hand tremor compensation, and a camera module and a mobile device including the same.

In one embodiment, a lens moving apparatus includes a bobbin including a lens barrel, a housing configured to accommodate the bobbin therein, an upper elastic member coupled to an upper portion of the bobbin and an upper portion of the housing, a lower elastic member coupled to a lower portion of the bobbin and a lower portion of the housing, a first coil disposed on the bobbin, a first magnet disposed on the housing, a circuit board disposed below the housing, a second coil disposed on the circuit board, a first sensor including first and second input terminals, to which a first input signal is input, and first and second output terminals, from which a first output signal is output based on a sensed result of a magnetic field strength of the first magnet, a first capacitor connected in parallel to the first and second output terminals of the first sensor, a second sensor including first and second input terminals, to which a second input signal is input, and first and second output terminals, from which a second output signal is output based on a sensed result of a magnetic field strength of the first magnet, and a second capacitor connected in parallel to the first and second output terminals of the second sensor.

In another embodiment, a lens moving apparatus includes a housing configured to support a first magnet, a bobbin having a first coil provided on an outer surface thereof so as to be opposite to the first magnet, the bobbin being disposed inside the housing so as to move in a first direction, a base disposed below the bobbin and spaced apart from the bobbin by a given distance, a second coil disposed above the base and below the housing, and a support member disposed on a side surface of the housing and configured to support the bobbin and the housing so that the bobbin and the housing are movable in a second direction and a third direction, which are perpendicular to the first direction, wherein the support member is coupled at an upper side thereof to an upper side of the housing, and is coupled at a lower side thereof to the base, and a portion of the support member is fixed to a lower portion of the side surface of the housing.

In another embodiment, a camera module includes the lens moving apparatus, and an image sensor mounted on the lens moving apparatus.

In a further embodiment, a mobile device includes a display module including a plurality of pixels, a color of which varies by an electrical signal, the camera module, the camera module being configured to convert an image, introduced through a lens, into an electrical signal, and a controller configured to control operations of the display module and the camera module.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
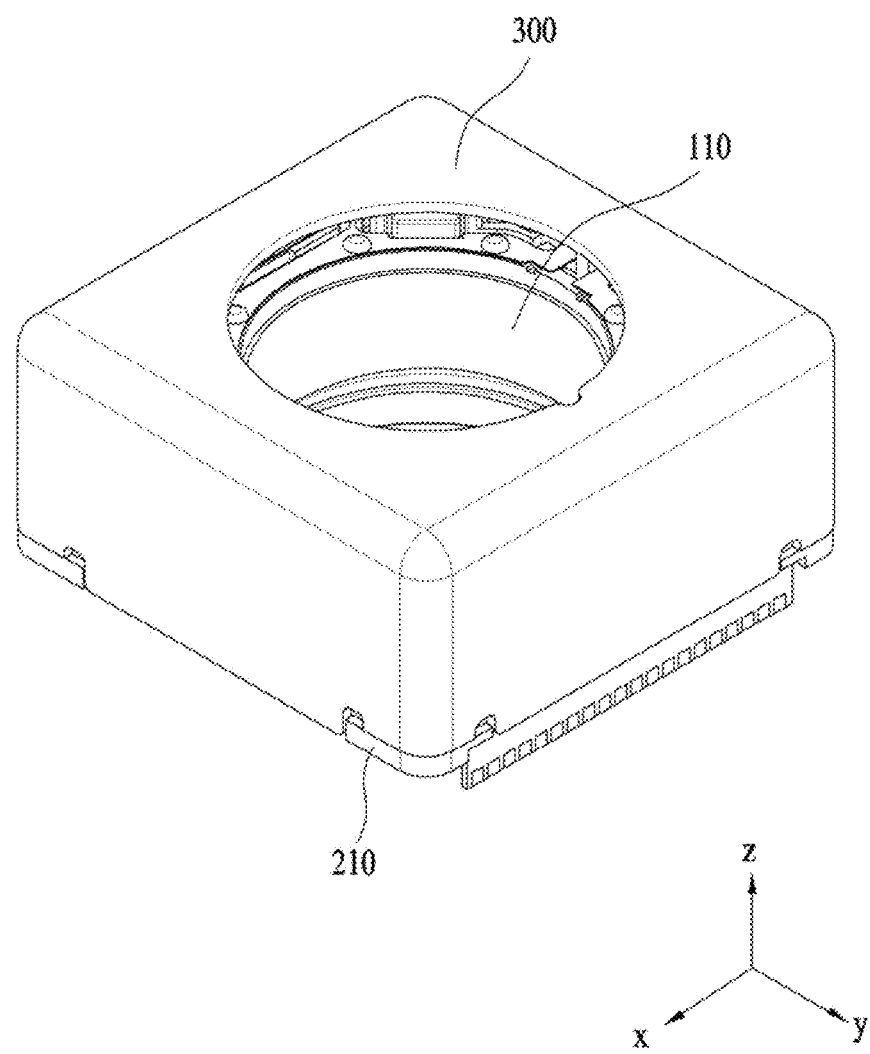
FIG. 1 is a schematic perspective view illustrating a lens moving apparatus according to an embodiment.

Hereinafter, embodiments will be described with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the disclosure rather unclear. Those skilled in the art will appreciate that some features in the drawings are exaggerated, reduced, or simplified for ease in description, and drawings and elements thereof are not shown always at the proper rate.

For reference, in the respective drawings, a rectangular coordinate system (x, y, z) may be used. In the drawings, the x-axis and the y-axis mean a plane perpendicular to an optical axis and, for convenience, an optical axis (z-axis) direction may be referred to as a first direction, an x-axis direction may be referred to as a second direction, and a y-axis direction may be referred to as a third direction.

A "hand tremor compensation device", which is applied to a subminiature camera module of a mobile device such as, for example, a smart phone or a tablet PC, may be a device that is configured to inhibit the contour line of a captured image from not being clearly formed due to vibration caused by the user's hand tremor when capturing a still image.

In addition, an "auto-focusing device" is a device that automatically focuses an image of a subject on an image sensor surface. The hand tremor compensation device and the auto-focusing device may be configured in various ways, and a lens moving apparatus according to the embodiments may move an optical module, which is constituted of at least one lens, in the first direction parallel to the optical axis, or relative to a plane defined by the second and third directions, which are perpendicular to the first direction, thereby performing hand tremor compensation motion and/or auto-focusing.

Figure 2:
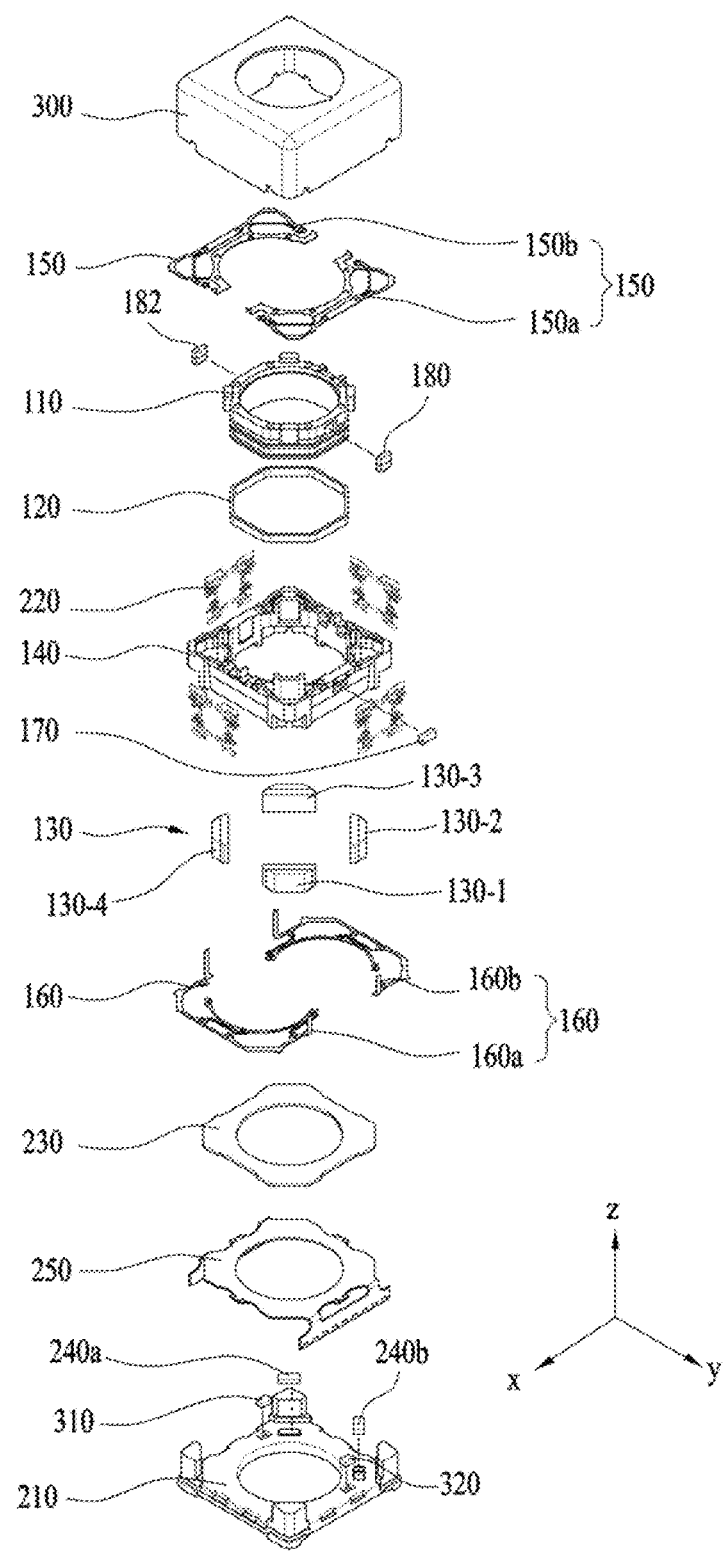
FIG. 2 is an exploded perspective view of the lens moving apparatus illustrated in FIG. 1.
Figure 3:
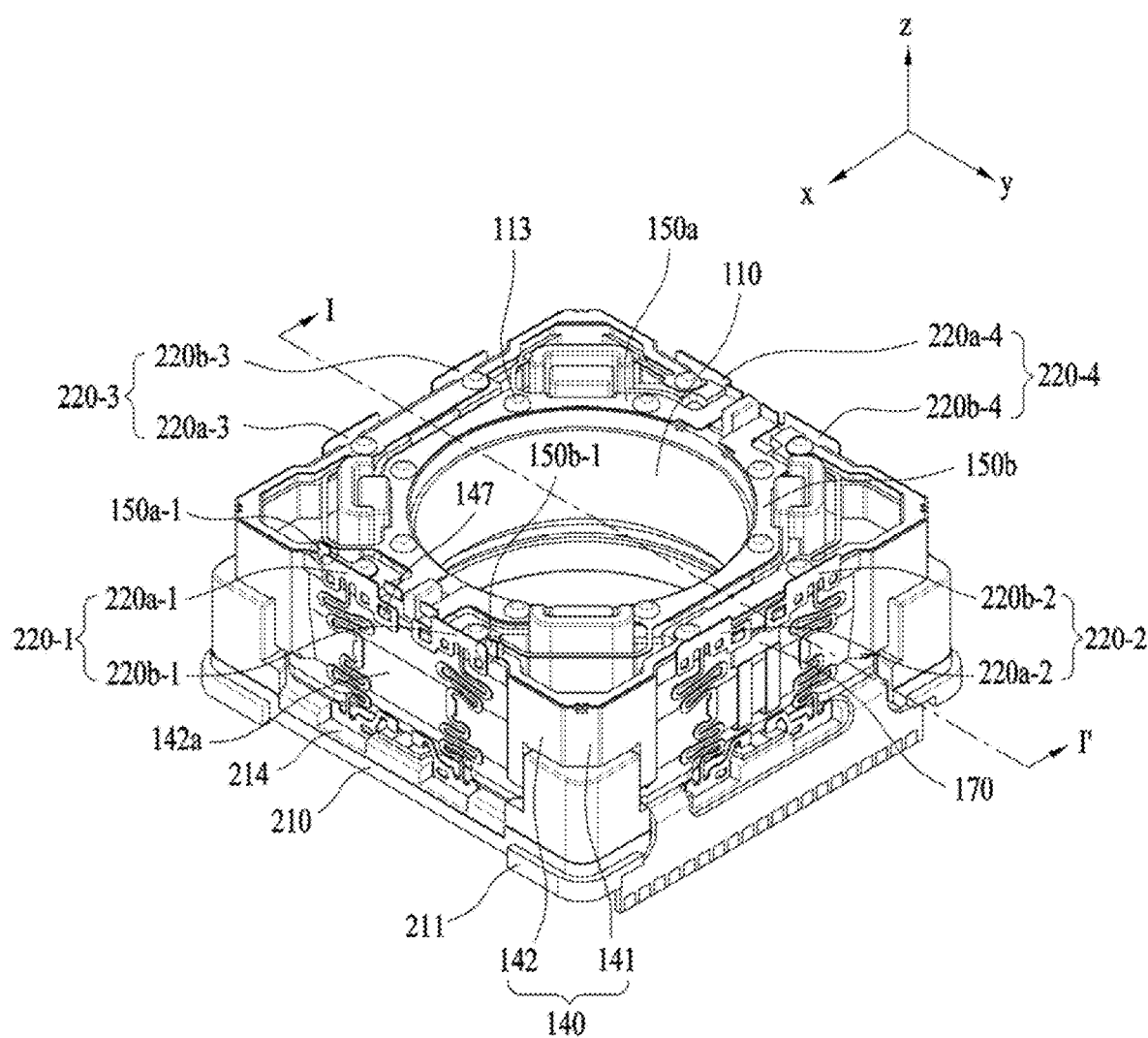
FIG. 3 is a perspective view illustrating the lens moving apparatus according to the embodiment after removal of a cover member illustrated in FIGS. 1 and 2.

FIG. 1 is a schematic perspective view illustrating a lens moving apparatus according to an embodiment, and FIG. 2 is an exploded perspective view of the lens moving apparatus illustrated in FIG. 1. FIG. 3 is a perspective view illustrating the lens moving apparatus according to the embodiment after removal of a cover member 300 illustrated in FIGS. 1 and 2.

Referring to FIGS. 1 to 3, the lens moving apparatus may include a cover member 300, an upper elastic member 150, a bobbin 110, a first coil 120, a housing 140, a first magnet 130, a lower elastic member 160, an auto-focusing (AF) position sensor 170, a support member 220, a second coil 230, a circuit board 250, a base 210, optical image stabilizer (OIS) position sensors 240a and 240b, and first and second capacitors 310 and 320.

The lens moving apparatus may further include a second magnet 180. In addition, the lens moving apparatus may further include a magnetic-field compensation metal 182.

First, the cover member 300 will be described.

The cover member 300 defines an accommodation space along with the base 210, such that the upper elastic member 150, the bobbin 110, the first coil 120, the housing 140, the magnet 130, the lower elastic member 160, the support member 220, the second coil 230, and the circuit board 250 are accommodated in the accommodation space.

The cover member 300 may generally take the form of a box, and the lower end of the cover member 330 may be coupled to the top of the base 210.

The cover member 300 may have an opening formed in the upper surface thereof in order to expose a lens (not illustrated) coupled to the bobbin 110 to outside light. In addition, the opening of the cover member 300 may be provided with a window formed of a light-transmitting material, in order to inhibit impurities, such as, for example, dust or moisture, from entering a camera module.

Next, the bobbin 110 will be described.

The bobbin 110 is placed inside the housing 140, which will be described below, and is movable in the first direction, for example, in the optical axis direction or the direction parallel to the optical axis via electromagnetic interaction between the first coil 120 and the first magnet 130.

Although not illustrated, the bobbin 110 may include a lens barrel (not illustrated) in which at least one lens is installed. However, it is to be noted that the lens barrel is a constituent element of a camera module, which will be described below, and may not be necessary in the lens moving apparatus. The lens barrel may be coupled inside the bobbin 110 in various manners.

The bobbin 110 has a bore for the mounting of the lens or the lens barrel. The bore in the bobbin 110 may have a circular, elliptical, or polygonal shape according to the shape of the lens or the lens barrel, without being limited thereto.

For example, the lens barrel may be coupled to the bobbin 110 via the coupling of female screw-threads, formed on the inner circumferential surface of the bobbin 110, and male screw-threads formed on the outer circumferential surface of the lens barrel. However, the embodiment is not limited thereto, and the lens barrel may be directly fixed inside the bobbin 110 via any method excluding screwing. Alternatively, one or more sheets of lenses may be integrally formed with the bobbin 110 without the lens barrel.

Figure 4:
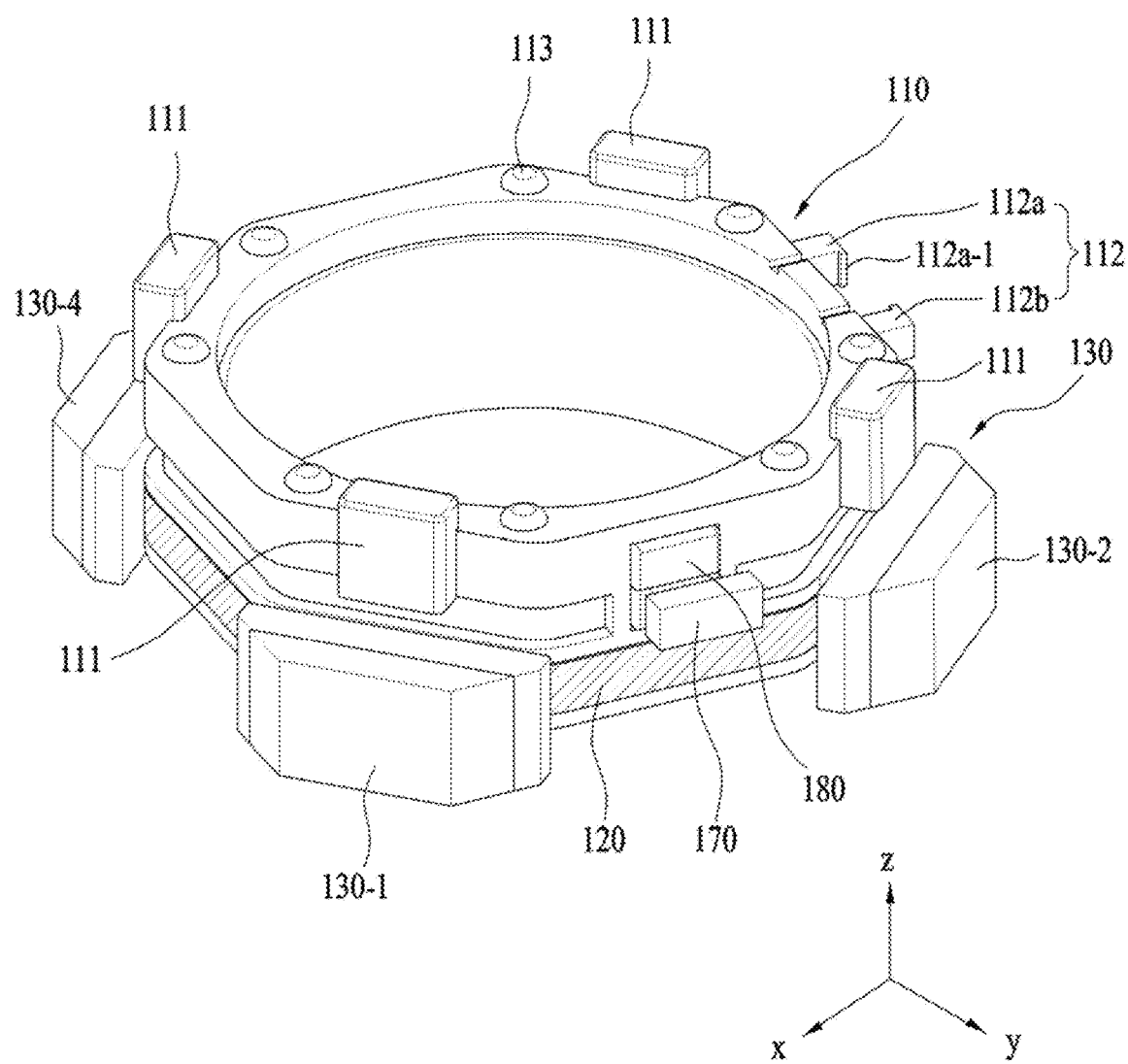
FIG. 4 is a perspective view of a bobbin, a first coil, a first magnet, an AF position sensor, and a second magnet illustrated in FIG. 2.
Figure 5:
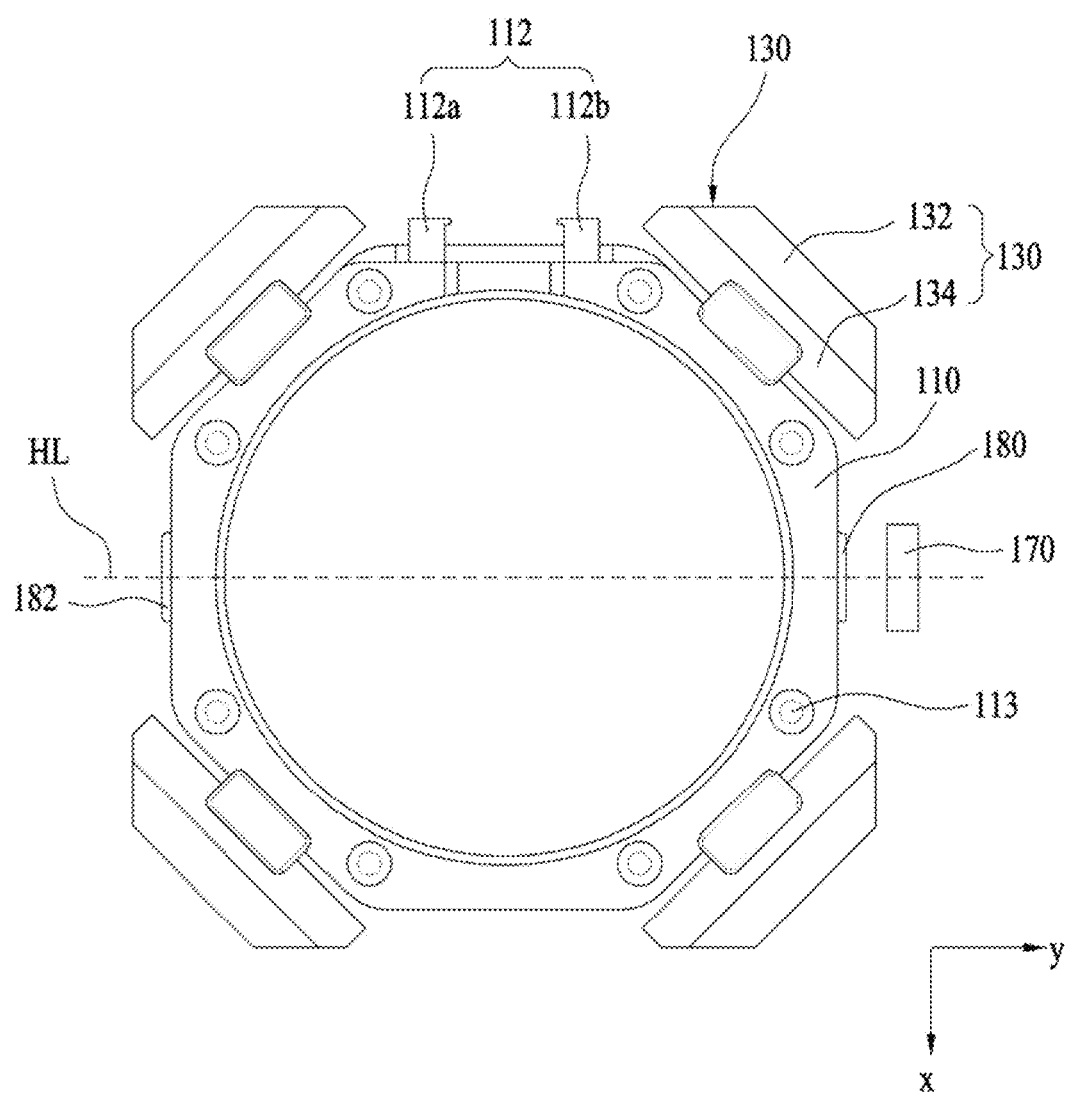
FIG. 5 is a plan view of FIG. 4.

FIG. 4 is a perspective view of the bobbin 110, the first coil 120, the first magnet 130, the AF position sensor 170, and the second magnet 180 illustrated in FIG. 2, and FIG. 5 is a plan view of FIG. 4.

Referring to FIGS. 4 and 5, the bobbin 110 may include at least one upper support boss 113 formed on the upper surface thereof and at least one lower support boss (not illustrated) formed on the lower surface thereof.

The upper support boss 113 of the bobbin 110 may be coupled to an inner frame 151 of the upper elastic member 150. Thereby, the bobbin 110 may be coupled and fixed to the upper elastic member 150.

The lower support boss (not illustrated) of the bobbin 110 may be coupled to an inner frame 161 of the lower elastic member 160. Thereby, the bobbin 110 may be coupled and fixed to the lower elastic member 160.

The bobbin 110 may include at least one first stopper 111, which protrudes upward from the upper surface, and at least one second stopper (or winding protrusion) 112, which horizontally protrudes from the side surface.

The first stopper 111 of the bobbin 110 may inhibit the upper end of the bobbin 110 from directly colliding with the inner side surface of the cover member 300 even if the bobbin 110 moves beyond a prescribed range due to, for example, external shock when moving in the first direction in order to perform auto-focusing. In addition, the first stopper 111 of the bobbin 110 may also serve to guide the installation position of the upper elastic member 150.

The second stopper 112 of the bobbin 110 may circumferentially protrude from the outer circumferential surface of the bobbin 110. The second stopper (or winding protrusion) 112 of the bobbin 110 may inhibit the outer circumferential surface of the bobbin 110 from directly colliding with the housing 140 even if the bobbin 110 moves beyond a prescribed range due to, for example, external shock when moving in the first direction, which is parallel to the optical axis, in order to perform auto-focusing. Although the second stopper 112 is illustrated in FIG. 4 as including two stoppers 112a and 112b, the embodiment is not limited as to the number of the second stoppers 112.

In addition, opposite ends, i.e. the start line and the end line of the first coil 120 may be wound respectively around the second stopper (or winding protrusions) 112 of the bobbin 110. The second stopper 112 of the bobbin 110 may be provided on the distal end thereof with a stepped portion 112a-1. The stepped portion 112a-1 may inhibit the wound first coil 120 from being separated, and may guide the position of the first coil 120. The second stopper 112 may be shaped such that the width thereof gradually increases with increasing distance from the inner circumferential surface of the bobbin 110, and the stepped portion 112a-1 may be formed so as to protrude from the distal end of the second stopper 112.

The bobbin 110 may further include a recess formed in the outer circumferential surface thereof so as to receive the second magnet 180. In addition, the bobbin 110 may further include a recess formed in the outer circumferential surface thereof so as to receive the magnetic-field compensation metal 182.

Next, the first coil 120 will be described.

The first coil 120 is disposed on the outer circumferential surface of the bobbin 110. For example, the first coil 120 may be disposed on the lower end of the outer circumferential surface of the bobbin 110.

For example, the first coil 120 may be located in a groove formed in the outer circumferential surface of the bobbin 110, and may take the form of a ring-shaped coil block, without being limited thereto. In another embodiment, rather than providing the groove in the outer circumferential surface of the bobbin 110, the first coil 120 may be directly wound around the outer circumferential surface of the bobbin 110.

The first coil 120 may have a circular or polygonal (e.g. octagonal) ring shape so as to correspond to the shape of the outer circumferential surface of the bobbin 110.

When current is supplied to the first coil 120, the first coil 120 may generate electromagnetic force via electromagnetic interaction with the first magnet 130, thereby causing the bobbin 110 to move in the first direction by the generated electromagnetic force.

Next, the second magnet 180 and the magnetic-field compensation metal 182 will be described.

Figure 11:
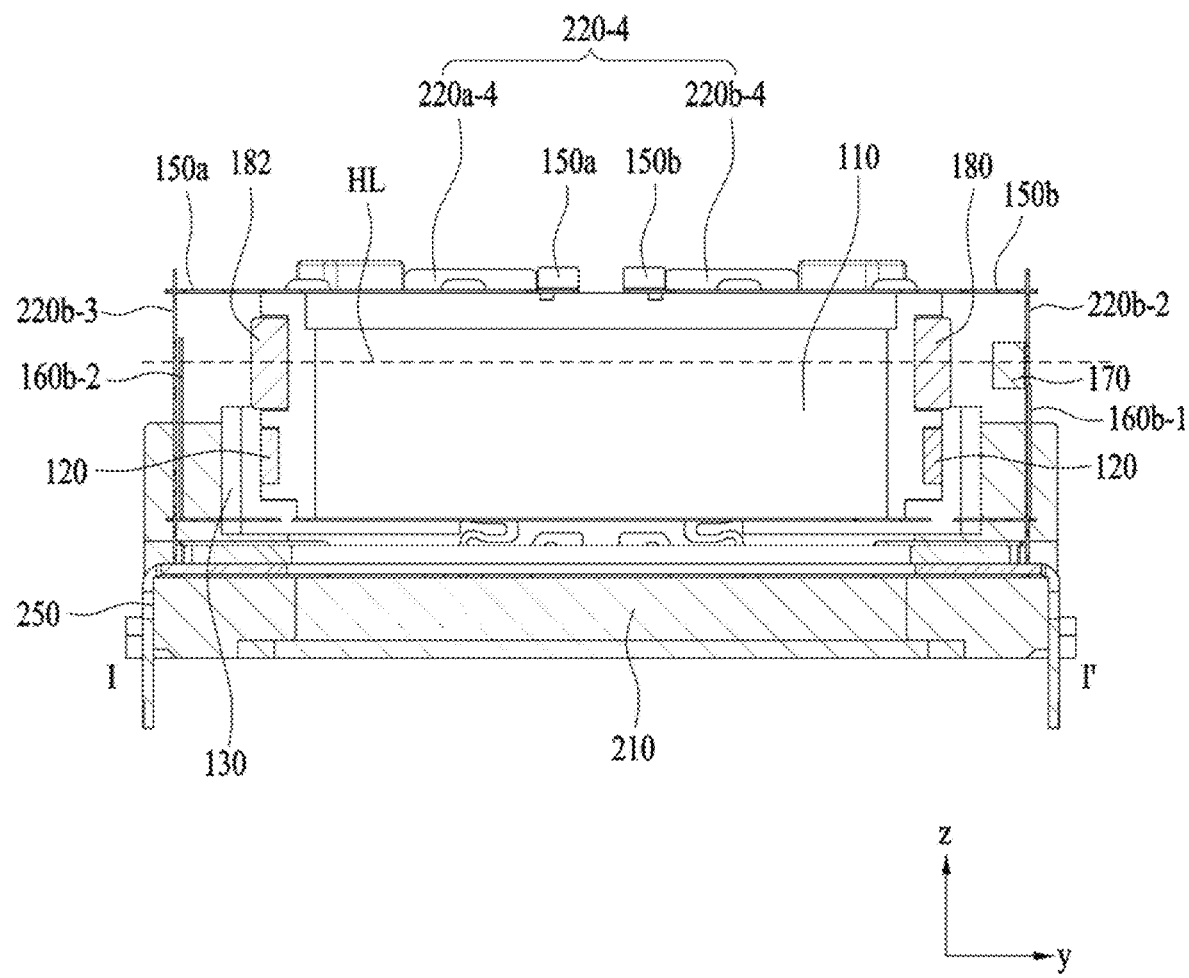
FIG. 11 is a sectional view taken along line I-I' illustrated in FIG. 3.

FIG. 11 is a sectional view taken along line I-I' illustrated in FIG. 3. For convenience of description, the housing 140 is not illustrated.

Referring to FIG. 11, the second magnet 180 may be disposed on the outer circumferential surface of the bobbin 110. For example, the second magnet 180 may be inserted, located, or fixed in the recess formed in the outer circumferential surface of the bobbin 110.

The second magnet 180 may be disposed on the outer circumferential surface of the bobbin 110 so as to be opposite to the AF position sensor 170 in the circumferential direction of the bobbin 110.

For example, the second magnet 180 may be located so as to align with or overlap the space between two neighboring first magnets 130-1 and 130-2 in the circumferential direction of the bobbin 110. This serves to minimize interference between the first magnet 130 and the second magnet 180.

In addition, although the second magnet 180 may be located above the first coil 120 wound around the bobbin 110 so as to be spaced apart from the first coil 120, the embodiment is not limited thereto.

The magnetic-field compensation metal 182 may be disposed on the outer circumferential surface of the bobbin 110 at a position symmetrical to the second magnet 180. For example, the magnetic-field compensation metal 182 and the second magnet 180 may be located on the same virtual reference line HL (see FIG. 5) in the second direction or the third direction, which may minimize the magnetic-field compensation metal 182 and the second magnet 180 from hindering the operation of the opponent.

The magnetic-field compensation metal 182 may be formed of a magnetic material, for example, a magnetic body or a magnet.

Next, the housing 140 will be described.

The housing 140 accommodates the bobbin 110 therein so as to allow the bobbin 110 to move in the first direction, which is parallel to the optical axis. The housing 140 may support the first magnet 130. In addition, the housing 140 may support the AF position sensor 170.

The housing 140 may generally have a hollow column shape. For example, the housing 140 may have a polygonal (e.g., a square or octagonal) or circular bore.

Figure 6:
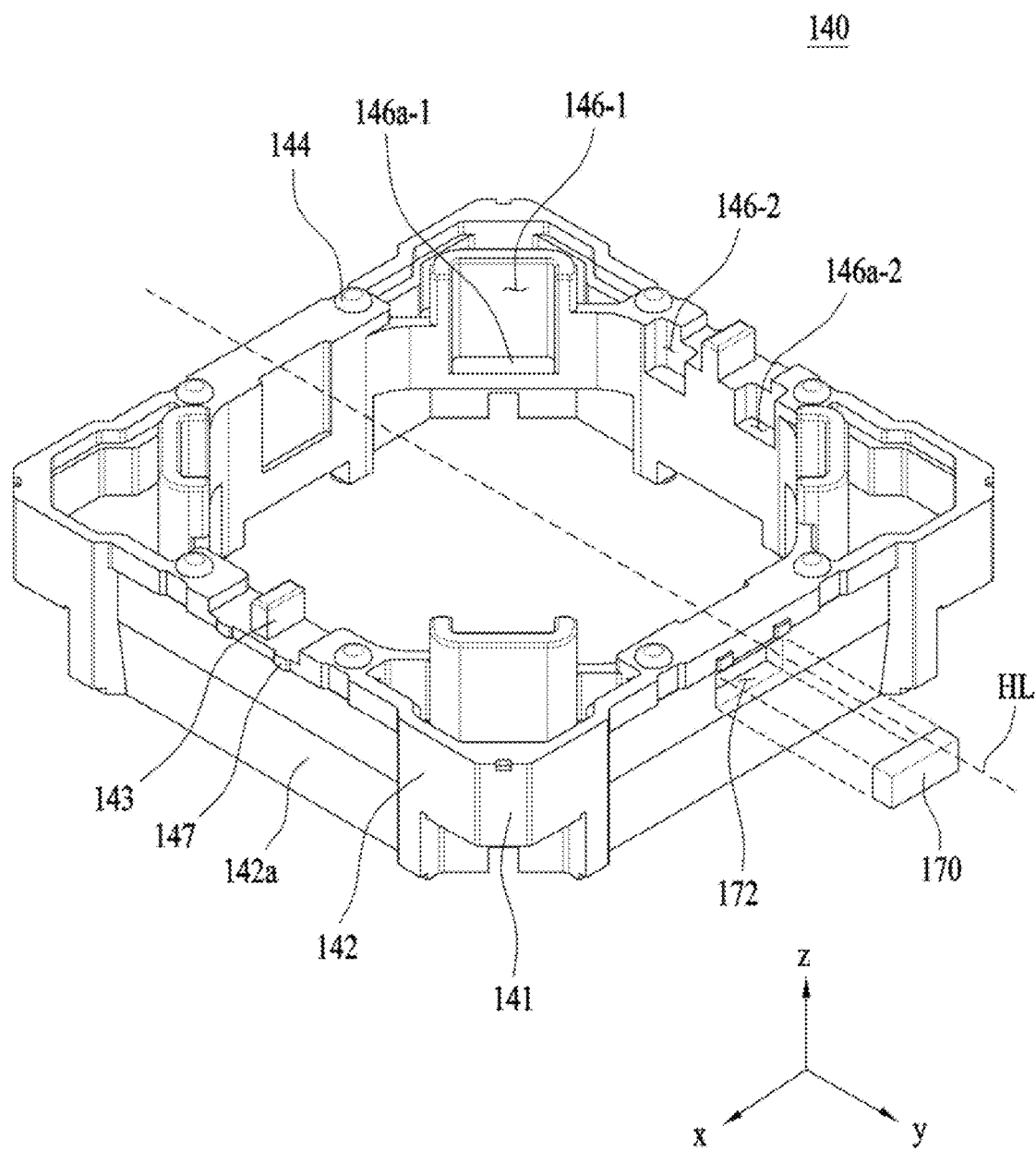
FIG. 6 is a plan perspective view of a housing illustrated in FIG. 2.
Figure 7:
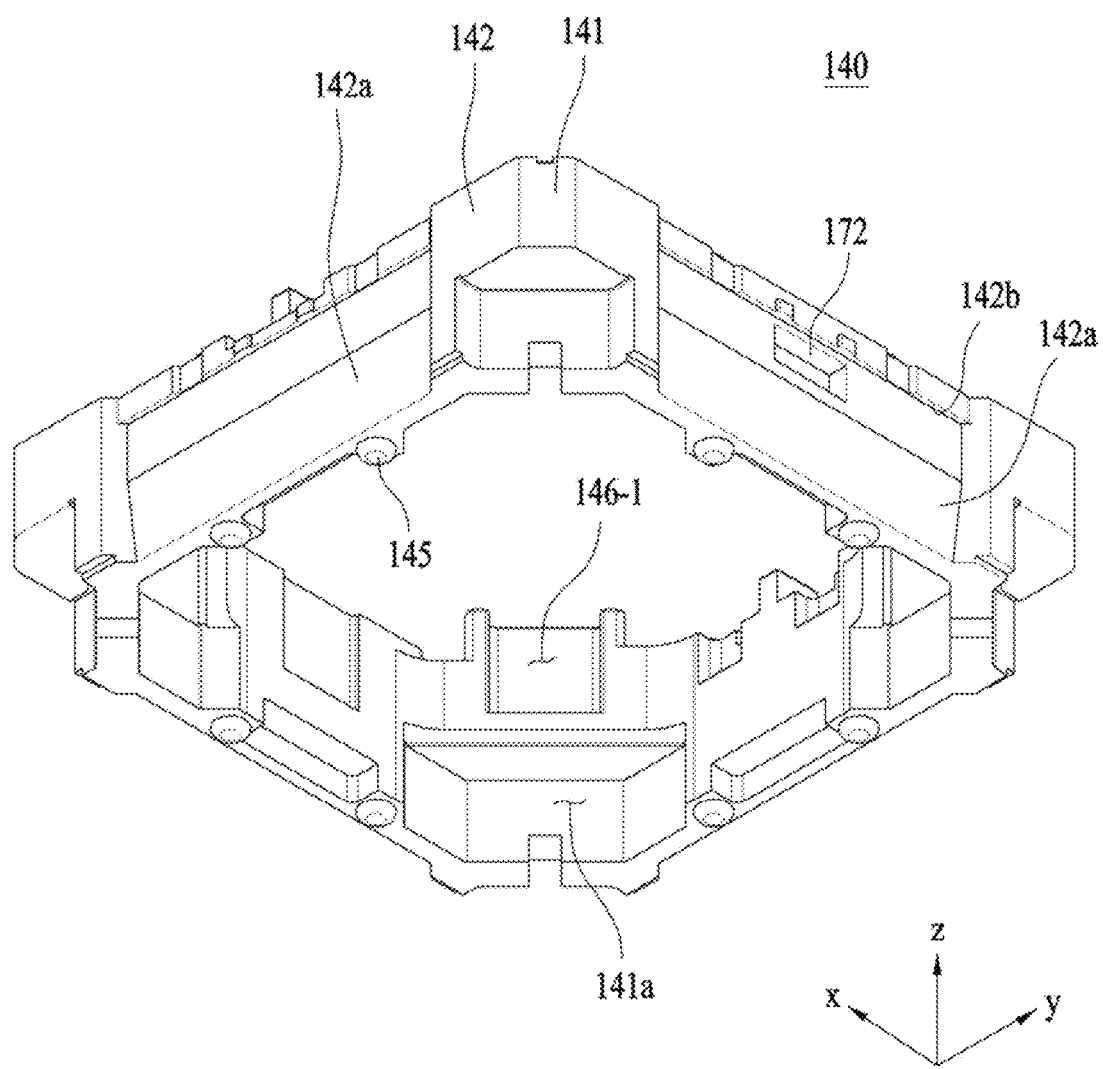
FIG. 7 is a bottom perspective view of the housing illustrated in FIG. 6.

FIG. 6 is a plan perspective view of the housing 140 illustrated in FIG. 2, and FIG. 7 is a bottom perspective view of the housing 140 illustrated in FIG. 6.

Referring to FIGS. 6 and 7, the housing 140 may include a first seating recess 146-1 corresponding to the first stopper 111 of the bobbin 110, and a second seating recess 146-2 corresponding to the second stopper 112 of the bobbin 110.

The housing 140 may include a plurality of side portions. For example, the housing 140 may include four first side portions 141 and four second side portions 142.

The first side portions 141 of the housing 140 may serve to install the first magnet 130. Each of the first side portions 141 of the housing 140 may be located between the two neighboring second side portions 142 and may connect the second side portions 142 to each other. The support member 220 may be disposed on the second side portions 142 of the housing 140.

Each of the first side portions 141 of the housing 140 may have a smaller area than the area of each second side portion 142, without being limited thereto.

The housing 140 may include seats 141a (see FIG. 7) provided in the inner surfaces of the first side portions 141 in order to accommodate or dispose the first magnet 130. Each of first magnets 130-1, 130-2, 130-3 and 130-4 may be inserted into, disposed on, or fixed to the seat 141a, which is provided in a corresponding one of the first side portions 141 of the housing 140.

The seat 141a of the housing 140, which faces the second coil 230, may have an opening formed in the bottom surface thereof. The bottom surface of the first magnet 130 fixed to the seat 141a of the housing 140 may directly face the second coil 230. The seat 141a of the housing 140 may be replaced with a mounting hole, through which a portion of the first magnet 130 may be fitted or exposed, rather than being configured as a recess illustrated in FIG. 7.

The housing 140 may include a recess 172, in which the AF position sensor 170 is inserted, disposed, or fixed. For example, any one of the second side portions 142 of the housing 140 may be provided with the recess 172 in which the AF position sensor 170 is located.

The recess 172 of the housing 140 and the recess of the bobbin 110 in which the second magnet 180 is located may be positioned so as to face each other. For example, the second magnet 180 and the AF position sensor 170 may be positioned so as to face each other in the second direction or the third direction.

In order to inhibit the housing 140 from directly colliding with the inner side surface of the cover member 300, the housing 140 may be provided on the upper surface thereof with at least one stopper 143. The stopper 143 of the housing 140 may serve as a guide that causes first and second upper elastic members 150a and 150b to be spaced apart from each other.

The housing 140 may include at least one upper support boss 144 formed on the upper surface thereof for the coupling of the upper elastic member 150.

For example, the upper support boss 144 of the housing 140 may be formed on the upper surface of the housing 140 corresponding to the second side portion 142 of the housing 140.

The housing 140 may include at least one lower support boss 145 formed on the lower surface thereof for the coupling and fixing of the lower elastic member 160.

In order to define a path for the passage of the support member 220 and to provide a space that is filled with gel-type silicon, which serves as a damper, the housing 140 may include a first recess 142a formed in the second side portion 142.

In order to inhibit the lower surface of the housing 140 from colliding with the base 210 and/or the circuit board 250, which will be described below, the housing 140 may include a fourth stopper (not illustrated) protruding from the lower surface thereof.

The housing 140 may further include a coupling boss 147, which is formed on the upper end of the second side portion 142 so as to be coupled to the support member 220. The coupling boss 147 of the housing 140 may serve to fix the support member 220 to the housing 140.

Next, the AF position sensor 170 will be described.

The AF position sensor 170 may detect variation in the strength of magnetic force emitted from the second magnet 180. The displacement (value) (or the position) of the bobbin 110 may be detected by a value output from the AF position sensor 170.

The AF position sensor 170 may be disposed on the outer circumferential surface of the housing 140 so as to be opposite to the second magnet 180. The AF position sensor 170 may be located in the recess 172 of the housing 140.

The AF position sensor 170 may take the form of a driver including a Hall sensor, or may be a Hall sensor alone.

Next, the first magnet 130 will be described.

The first magnet 130 is disposed on the outer circumferential surface of the housing 140 so as to correspond to the first coil 120. For example, the first magnet 130 may be disposed on the first side portion 141 of the housing 140.

A plurality of first magnets 130 may be provided. For example, the first magnets 130-1 to 130-4 may be spaced apart from one another so as to be disposed on the respective first side portions 141 of the housing 140.

Each of the first magnets 130-1 to 130-4 may have a trapezoidal shape, without being limited thereto. In another embodiment, each first magnet may have a rectangular shape.

For example, each of the first magnets 130-1 to 130-4 may be oriented such that the wide surface thereof faces the outer circumferential surface of the housing 140, without being limited thereto.

In addition, each of the first magnets 130-1 to 130-4 may be arranged so as to face the first coil 120. The respective first magnets 130-1 to 130-4 may be arranged such that the entire surface thereof facing the first coil 120 has the same polarity. For example, each of the first magnets 130-1 to 130-4 may be arranged such that the surface thereof facing the first coil 120 is an N-pole and an opposite surface of the N-pole is an S-pole. However, the embodiment is not limited thereto, and the polarities of the respective first magnets 130-1 to 130-4 may be contrary to the above description.

In another embodiment, each of the first magnets 130-1 to 130-4 may be divided into two planes perpendicular to the optical axis, such that the surface thereof facing the first coil 120 is divided into two or more parts.

Next, the upper elastic member 150, the lower elastic member 160, and the support member 220 will be described.

Figure 8:
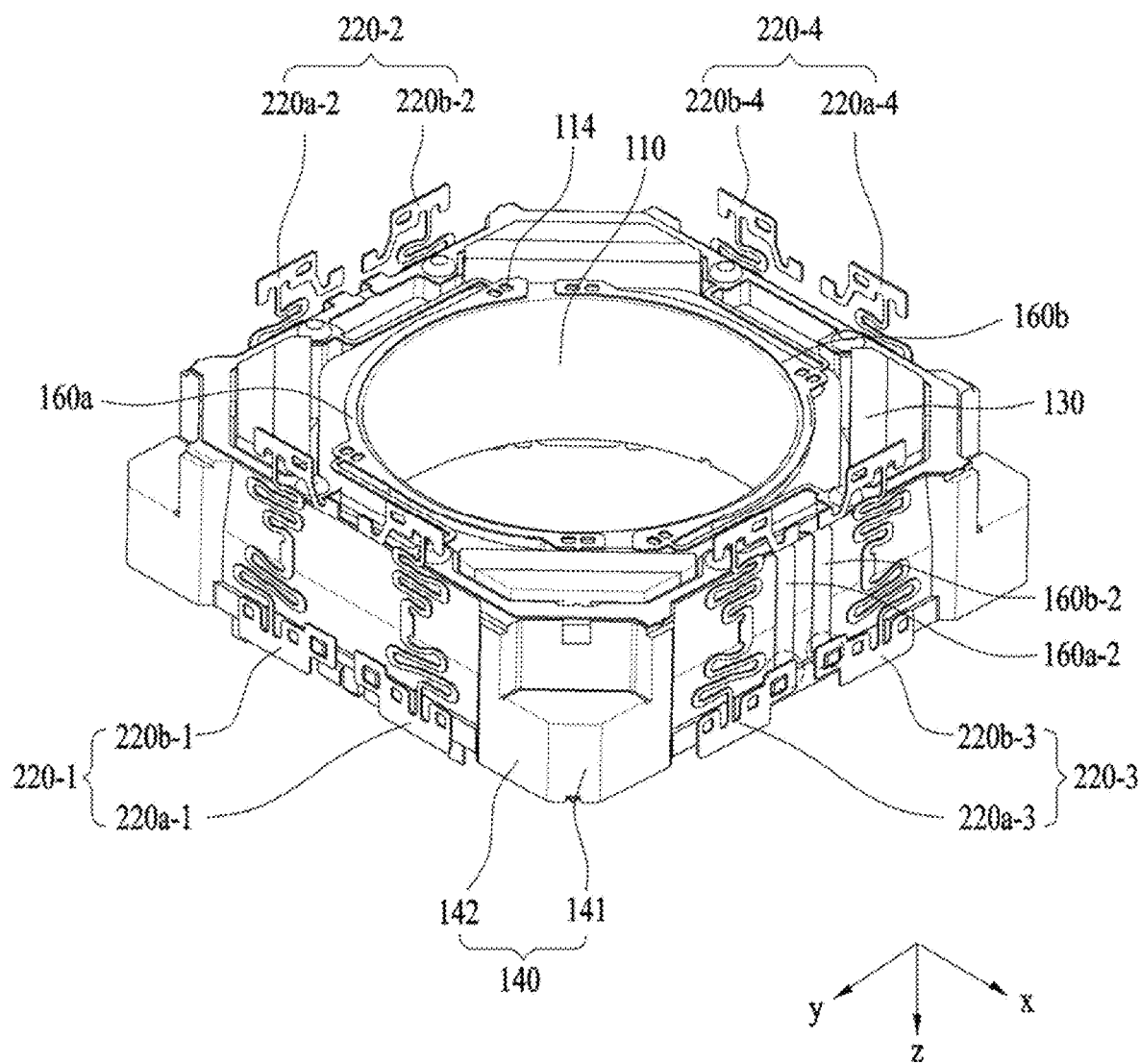
FIG. 8 is a rear perspective view illustrating the coupled state of the bobbin, the housing, a lower elastic member, and a plurality of support members.

FIG. 8 is a rear perspective view illustrating the coupled state of the bobbin 110, the housing 140, the lower elastic member 160, and a plurality of support members 220, FIG.

Figure 10:
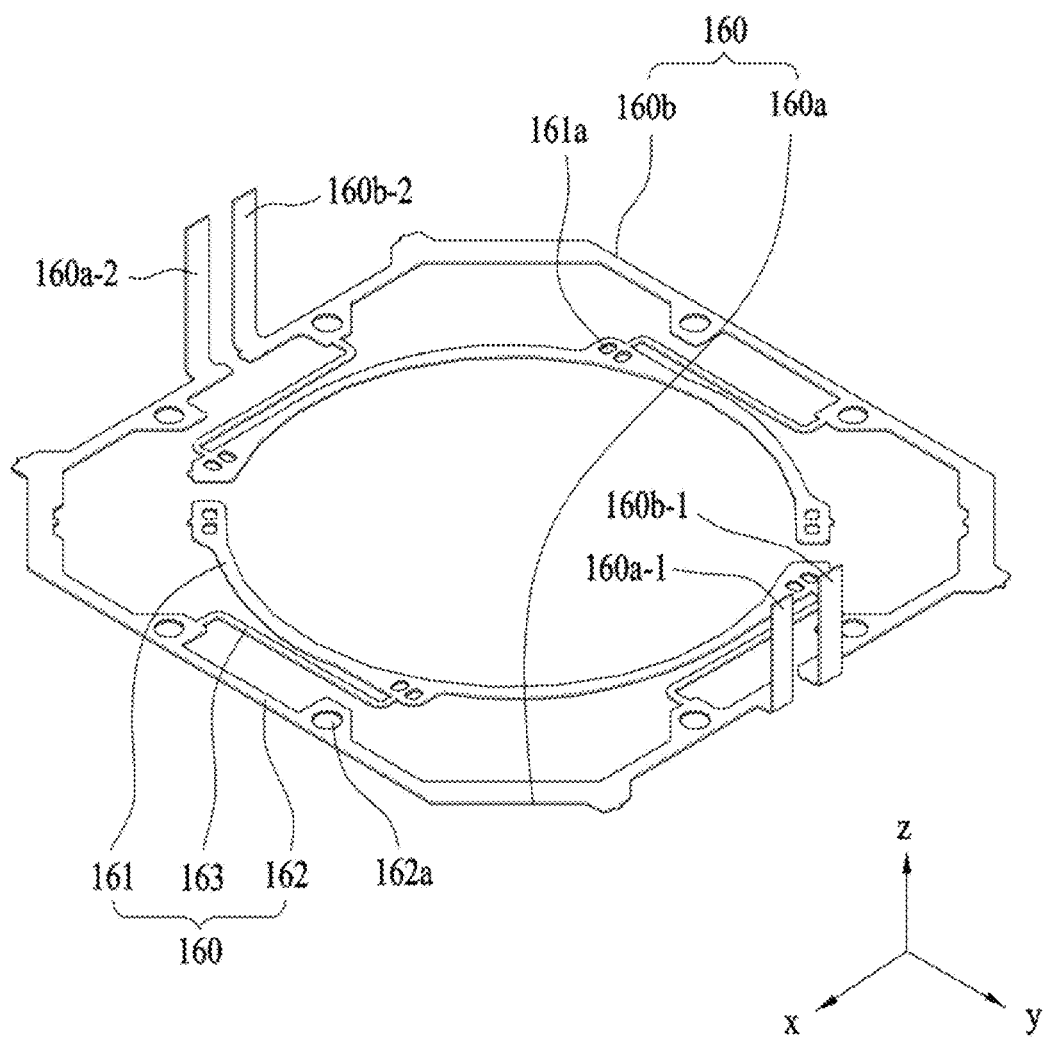
FIG. 10 is a view illustrating a lower elastic member of FIG. 2.

9 is a view illustrating the upper elastic member 150 of FIG. 2, and FIG. 10 is a view illustrating the lower elastic member 160 of FIG. 2.

Figure 9:
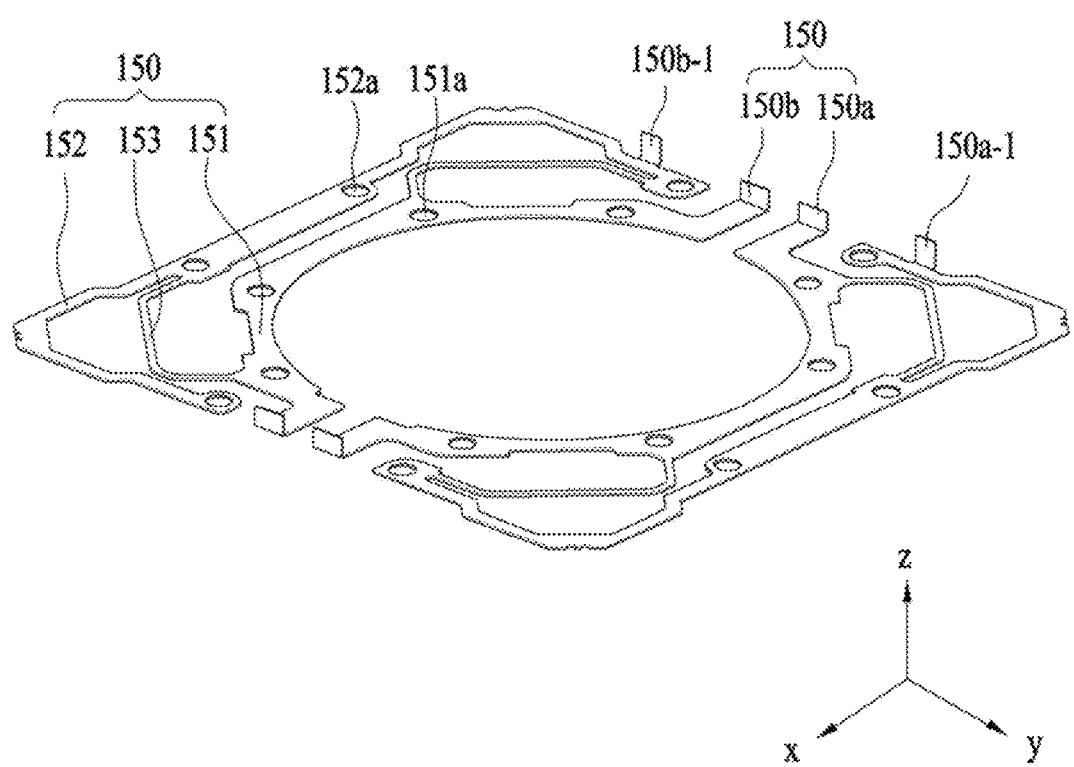
FIG. 9 is a view illustrating an upper elastic member of FIG. 2.

Referring to FIGS. 8 to 10, the upper elastic member 150 and the lower elastic member 160 elastically support the bobbin 110. At least one of the upper elastic member 150 and the lower elastic member 160 may be divided into two parts in order to receive power of different polarities. The upper elastic member 150 may include first and second upper elastic members 150a and 150b, which are electrically separated from each other, and the lower elastic member 160 may include first and second lower elastic members 160a and 160b, which are electrically separated from each other.

Each of the first and second upper elastic members 150a and 150b may include an inner frame 151 coupled to the bobbin 110, an outer frame 152 coupled to the housing 140, and a connection portion 153, which connects the inner frame 151 and the outer frame 152 to each other.

Each of the first and second lower elastic members 160a and 160b may include an inner frame 161 coupled to the bobbin 110, an outer frame 162 coupled to the housing 140, and a connection portion 163, which connects the inner frame 161 and the outer frame 162 to each other. The upper elastic member 150 and the lower elastic member 160 may take the form of leaf springs, without being limited thereto.

The connection portions 153 and 163 of the upper and lower elastic members 150 and 160 may be bent at least one time so as to form a given pattern.

The inner frame 151 of each of the first and second upper elastic members 150a and 150b may be provided with a through-hole 151a for the coupling of the upper support boss 113 of the bobbin 110.

The outer frame 152 of each of the first and second upper elastic members 150a and 150b may be provided with a through-hole 152a for the coupling of the upper support boss 144 of the housing 140.

The inner frame 161 of each of the first and second lower elastic members 160a and 160b may be provided with a through-hole 161a for the coupling of the lower support boss of the bobbin 110.

The outer frame 162 of each of the first and second lower elastic members 160a and 160b may be provided with a through-hole 162a for the coupling of the lower support boss of the housing 140.

The coupling between the upper support boss 113 of the bobbin 110 and the through-hole 151a, the coupling between the upper support boss 144 of the housing 140 and the through-hole 152a, the coupling between the lower support boss of the bobbin 110 and the through-hole 161a, and the coupling between the lower support boss of the housing 140 and the through-hole 162a may be implemented by thermal bonding, or using an adhesive such as, for example, epoxy.

At least one of the upper elastic member 150 and the lower elastic member 160 may be electrically connected to the first coil 120.

For example, the first upper elastic member 150a and the second upper elastic member 150b may be electrically connected to the first coil 120. The start line of the first coil 120 may be electrically connected to the first upper elastic member 150a, and the end line of the first coil 120 may be electrically connected to the second upper elastic member 150b.

The first upper elastic member 150a may further include a first support member contact portion 150a-1, and the second upper elastic member 150b may further include a second support member contact portion 150b-1.

The first and second support member contact portions 150a-1 and 150b-1 may protrude from the respective outer frames 152. Although the first and second support member contact portions 150a-1 and 150b-1 may protrude in the first direction, which is the optical axis direction, the embodiment is not limited as to the direction in which the first and second support member contact portions 150a-1 and 150b-1 protrude.

The first lower elastic member 160a may include one or more first sensor contact portions 160a-1 and 160a-2, and the second lower elastic member 160b may include one or more second sensor contact portions 160b-1 and 160b-2. Although FIG. 10 illustrates the two first sensor contact portions 160a-1 and 160a-2 and the two second sensor contact portions 160b-1 and 160b-2, the embodiment is not limited as to the number of the sensor contact portions.

The first sensor contact portions 160a-1 and 160a-2 and the second sensor contact portions 160b-1 and 160b-2 may protrude from the respective outer frames 162 of the first and second lower elastic members 160a and 160b. Although FIG. 10 illustrates that the first and second sensor contact portions 160a-1, 160a-2, 160b-1 and 160b-2 protrude from the outer frames 162 in the first direction, the embodiment is not limited as to the shape of each of the first and second sensor contact portions 160a-1, 160a-2, 160b-1 and 160b-2.

The AF position sensor 170 may include total four terminals including two input terminals and two output terminals.

For example, two of the four terminals of the AF position sensor 170 may be electrically connected to the first sensor contact portions 160a-1 and 160a-2 of the first lower elastic member 160a and the second sensor contact portions 160b-1 and 160b-2 of the second lower elastic member 160b, and may be electrically connected to the circuit board 250 via two of the support members 220a-1 to 220a-4 and 220b-1 and 220b-4, which are connected to the first and second sensor contact portions 160a-1, 160a-2, 160b-1 and 160b-2.

For example, the remaining two of the four terminals of the AF position sensor 170 may be electrically connected to the other two of the support members 220a-1 to 220a-4 and 220b-1 and 220b-4, and consequently, may be electrically connected to the circuit board 250.

The first coil 120 may be electrically connected to the circuit board 250 via two of the support members 220a-1 to 220a-4 and 220b-1 to 220b-4, which are electrically connected to the first and second upper elastic members 150a and 150b.

The electrical connection of the AF position sensor 170 and the circuit board 250 and the electrical connection of the first coil 120 and the circuit board 250 are not limited to the above description, and may be implemented in various forms via combinations of the first and second upper elastic members 150a and 150b, the first and second lower elastic members 160a and 160b, and the support members 220a-1 to 220b-4 and 220b-1 to 220b-4.

The support members 220 may be disposed on the second side portions 142 of the housing 140 and may support the housing 140 so that the housing 140 is spaced apart from the base 210 by a given distance. The support members 220 may serve to supply electrical signals from the circuit board 250 to the upper elastic member 150 and to increase force required to fix the upper elastic member 150 to the base 210.

Figure 13:
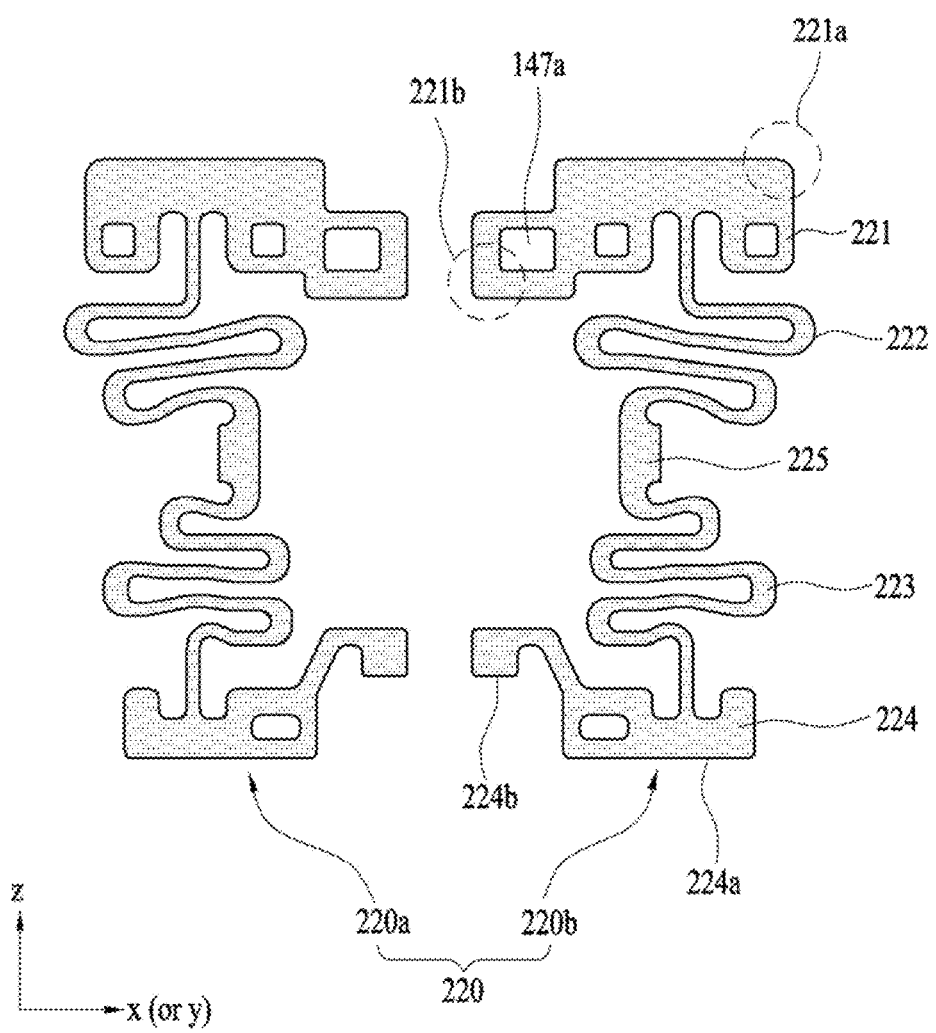
FIG. 13 is a front view of the support member.

FIG. 13 is a front view of the support member 220.

Referring to FIG. 13, one end of the support member 220 may be fixed to the upper end of the second side portion 142 of the housing 140, for example, to the coupling boss 147, and the other end of the support member 220 may be fixed to the base 210.

A plurality of support members 220 may be provided. Each of the support members 220-1 to 220-4 may be disposed on a corresponding one of the second side portions 142 of the housing 140.

The support member 220 may be connected to the outer frame 152 of the upper elastic member 150, and may be electrically connected to the upper elastic member 150.

The support member 220 may be formed separately from the upper elastic member 150, and may be configured as a member that may provide elastic support force, for example, a leaf-spring, a coil spring, or a suspension wire. Alternatively, in another embodiment, the support member 220 may be integrally formed with the upper elastic member 150.

Each of the support members 220-1 to 220-4 may be divided into first and second support members 220a-1 to 220a-4 and 220b-1 to 220b-4. The first and second support members 220a-1 to 220a-4 and 220b-1 to 220b-4 may be spaced apart from each other and may be disposed on the corresponding second side portions 142 of the housing 140.

Each of the first and second support members 220a-1 to 220a-4 and 220b-1 to 220b-4 may include an upper terminal portion 221, elastic-deformation portions 222 and 223, a lower terminal portion 224, and a damping connection portion 225.

The upper terminal portion 221 may be connected to the upper end of the second side portion 142 of the housing 140, and may have a recess or coupling hole 147a for the coupling of the coupling boss 147 formed on the upper end of the second side portion 142 of the housing 140.

The upper terminal portion 221 may include a first contact terminal portion 221a, which is electrically connected to the outer frame 152 of the upper elastic member 150, and a second contact terminal portion 221b, which is electrically connected to the inner frame 151 of the upper elastic member 150.

The elastic-deformation portions 222 and 223 may take the form of a line that is bent at least one time, and may have a given pattern. For example, the elastic-deformation portions illustrated in FIG. 13 may include a first elastic-deformation portion 222, which is bent plural times, and a second elastic-deformation portion 223, which is bent plural times.

In another embodiment, the first and second elastic-deformation portions 222 and 223, which are separate from each other, may be replaced with a single elastic-deformation portion, and the elastic-deformation portion may be configured as a suspension wire.

When the housing 140 moves in the second and third directions, which define the plane perpendicular to the optical axis, the elastic-deformation portions 222 and 223 may be slightly elastically deformed in the direction in which the housing 140 moves. The housing 140 may move only in the second and third directions, which define the plane perpendicular to the optical axis, with substantially no variation in position with regard to the first direction, which is parallel to the optical axis, thereby increasing the accuracy of hand tremor compensation. This uses a characteristic that the elastic-deformation portion may stretch in the longitudinal direction.

The lower terminal portion 224 may be provided on the end of the support member 220, for example, on the distal end of the elastic-deformation portion (e.g. 223).

The lower terminal portion 224 may take the form of a plate having a greater width than a width of the elastic-deformation portions 222 and 223, without being limited thereto. In another embodiment, the width of the lower terminal portion 224 may be equal to or smaller than the width of the elastic-deformation portions 222 and 223.

One end 224a of the lower terminal portion 224 may be inserted into a support member seating recess 214 of the base 210, and may be fixed to the support member seating recess 214 using an adhesive such as, for example, epoxy. However, the disclosure is not limited thereto. In another embodiment, the end 224a of the lower terminal portion 224 and the support member seating recess 214 may be fitted to each other without using the adhesive.

The other end 224b of the lower terminal portion 224 may be electrically connected to pads 252-1, 252-2, 252-3 and 252-4 of the circuit board 250.

The damping connection portion 225 may be located between the first elastic-deformation portion 222 and the second elastic-deformation portion 223 and may connect the first and second elastic-deformation portions 222 and 223 to each other, without being limited thereto. In another embodiment, the damping connection portion 225 may be connected to a single elastic-deformation portion.

The damping connection portion 225 may take the form of a plate so as to perform the damping function. The damping connection portion 225 may have a plurality of holes or recesses.

Figure 12:
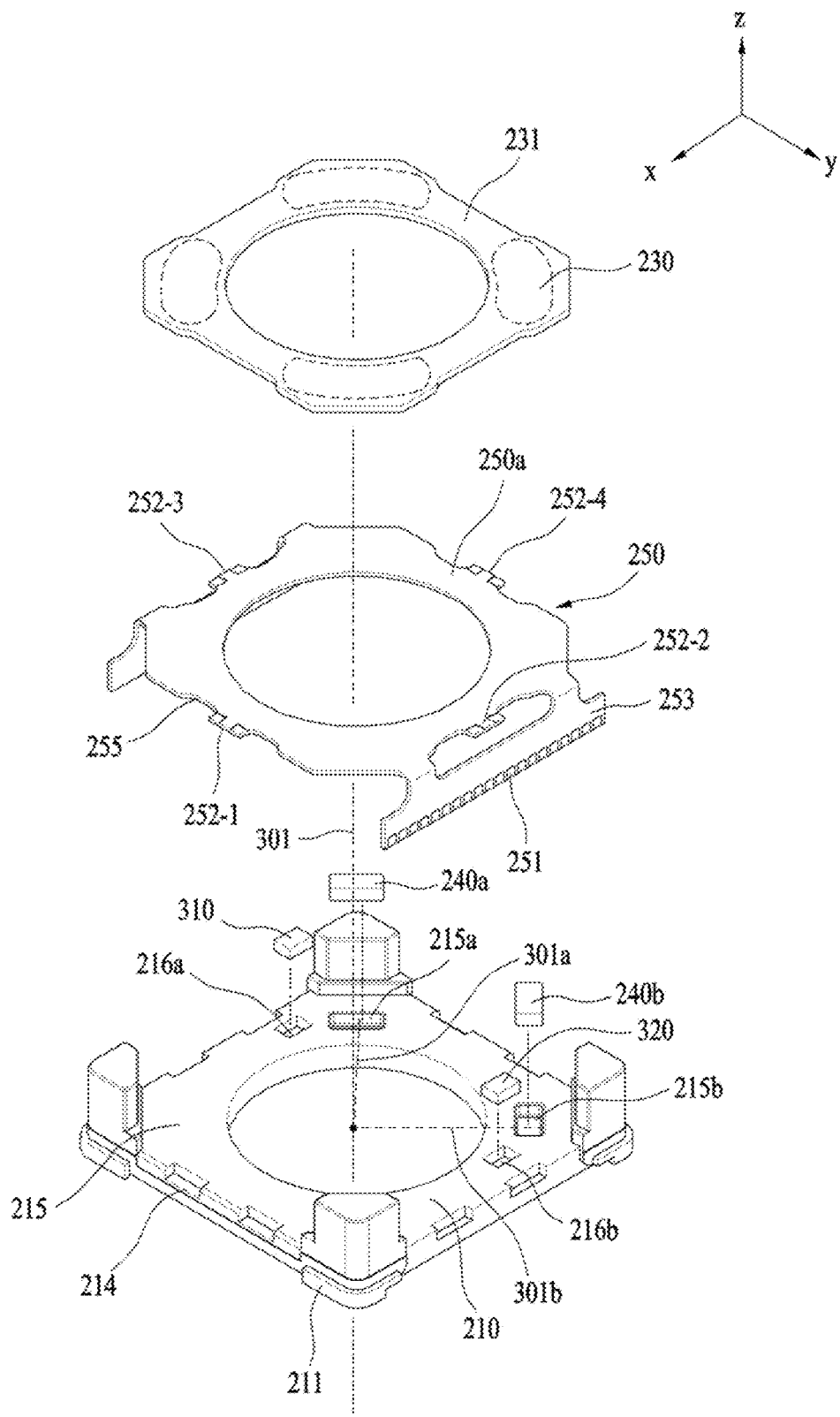
FIG. 12 is an exploded perspective view illustrating a second coil, a circuit board, OIS position sensors, capacitors and a base.

FIG. 12 is an exploded perspective view illustrating the second coil 230, the circuit board 250, the OIS position sensors 240a and 240b, the capacitors 310 and 320, and the base 210.

Referring to FIG. 12, the base 210 may have a bore corresponding to the bore of the bobbin 110 and/or the bore of the housing 140, and may have a shape that coincides with or corresponds to that of the cover member 300, for example, a square shape.

The support member seating recess 214, to which the end 224a of the lower terminal portion 224 of the support member 220 is coupled, may be formed in the edge of the upper surface of the base 210.

The base 210 may be provided in the upper surface thereof with recesses 215a and 215b, in which the OIS position sensor 240a and 240b are located. In addition, the base 210 may further be provided in the upper surface thereof with recesses 216a and 216b, in which the first and second capacitors 310 and 320 are located.

The OIS position sensors 240a and 240b may be located between the circuit board 250 and the base 210, and may be aligned with the center of the second coil 230 in the first direction.

For example, the OIS position sensors 240a and 240b may be located in the recesses 215a and 215b of the base 210. The OIS position sensor 240a may sense that the housing 140 moves in the direction perpendicular to the first direction.

The OIS position sensors 240a and 240b may sense variation in the strength of magnetic force of the first magnets 130-1 to 130-4. The OIS position sensors 240a and 240b may be Hall sensors, without being limited thereto, and may be any sensor so long as it can sense variation in magnetic force.

The OIS position sensors 240a and 240b may be electrically connected to the circuit board 250 via, for example, solders.

The circuit board 250 may be disposed on the upper surface of the base 210, and may have a bore corresponding to the bore of the bobbin 110, the bore of the housing 140, and/or the bore of the base 210. The outer circumferential surface of the circuit board 250 may have a shape that coincides with or corresponds to the shape of the upper surface of the base 210, for example, a square shape, without being limited thereto.

The second coil 230 may be disposed above the circuit board 250, and the OIS position sensors 240a and 240b and the first and second capacitors 310 and 320 may be disposed under the circuit board 250.

The circuit board 250 may be electrically connected to second coils 230a to 230d, the OIS position sensors 240a and 240b, the support members 220, and the first and second capacitors 310 and 320.

The circuit board 250 may be a Flexible Printed Circuit Board (FPCB), without being limited thereto. In another embodiment, terminals of the circuit board 250 may be directly formed on the surface of the base 210 via, for example, a surface electrode method.

The circuit board 250 may include the pads 252-1 to 252-4 connected to the other ends of the support members 220.

The circuit board 250 may have at least one terminal surface 253 bent from the upper surface thereof, a plurality of terminals 251 being formed on the terminal surface 253 so as to receive electrical signals from the outside.

Next, the second coils 230a to 230d will be described.

The second coils 230a to 230d are disposed on the upper surface of the circuit board 250 so as to correspond to, to be opposite to, or to be aligned with the first magnets 130-1 to 130-4.

One or more second coils 230a to 230d may be provided, and the number of the second coils 230a to 230d may be the same as the number of the first magnets 130-1 to 130-4, without being limited thereto.

The second coils 230a to 230d may be included in a circuit board 231, which is separate from the circuit board 250, without being limited thereto. In another embodiment, the second coils 230a to 230d may be disposed on the upper surface of the circuit board 250 so as to be spaced apart from one another.

Total four second coils 230a to 230d may be installed on the upper surface of the circuit board 250 so as to be spaced apart from one another. For example, the second coils 230a to 230d may include second-direction second coils 230a and 230b, which are aligned so as to be parallel to the second direction, and third-direction second coils 230c and 230d, which are aligned so as to be parallel to the third direction.

In another embodiment, the second coils may include one second-direction second coil and one third-direction second coil. In a further embodiment, the second coils may include three or more second-direction second coils, and three or more third-direction second coils.

In some embodiments, the circuit board 250 may be a Flexible Printed Circuit Board (FPCB), without being limited thereto. In another embodiment, terminals of the circuit board 250 may be directly formed on the surface of the base 210 via, for example, a surface electrode method.

The circuit board 250 may receive electrical signals from the outside through the terminals 251, and may supply the electrical signals to the first coil 120, the second coil 230, the AF position sensor 170, and the OIS position sensors 240a and 240b. In addition, the circuit board 250 may output signals from the AF position sensor 170 and the OIS position sensors 240a and 240b to the outside through the terminals 251.

For example, first power (e.g. (+) power) and second power (e.g. (−) power) may be provided to the respective first and second coils 120 and 230. In addition, a first input signal (e.g. (+) input signal) and a second input signal (e.g. (−) input signal) may be provided to each of the AF position sensor 170 and the OIS position sensors 240a and 240b. In addition, a first output signal (e.g. (+) output signal) and a second output signal (e.g. (−) output signal) may be output from each of the AF position sensor 170 and the OIS position sensors 240a and 240b.

For example, the circuit board 250 may include four terminals for the first and second coils 120 and 230, four terminals for the AF position sensor 170, and eight terminals for the OIS position sensors 240a and 240b.

Figure 14:
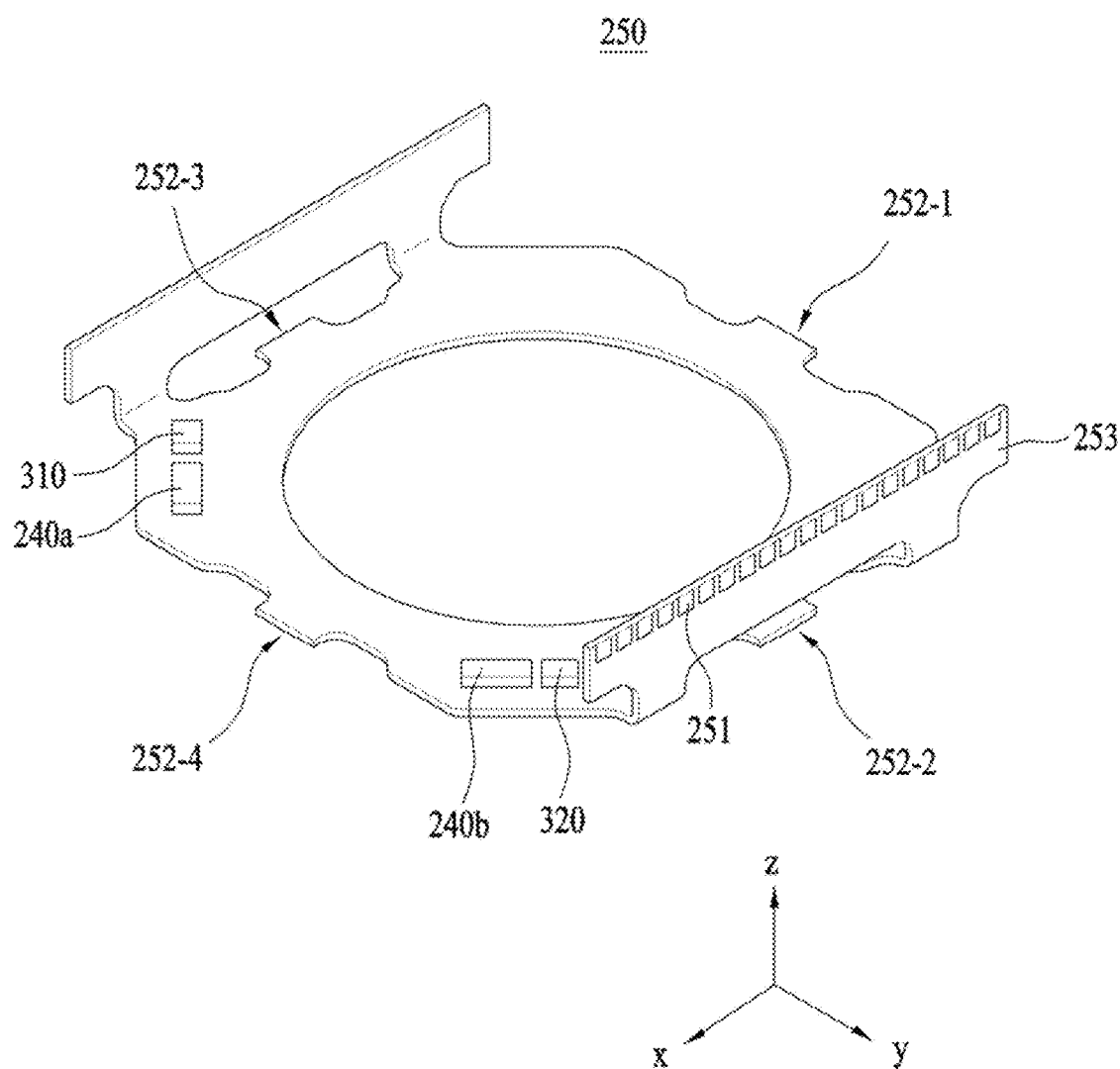
FIG. 14 is a view illustrating the OIS position sensors and first and second capacitors disposed or mounted on the circuit board of FIG. 12.

FIG. 14 is a view illustrating the OIS position sensors 240a and 240b and the first and second capacitors 310 and 320 disposed or mounted on the circuit board 250 of FIG. 12.

Referring to FIG. 14, the first OIS position sensor 240a may be located so as to be aligned with a first reference line 301a, and the second OIS position sensor 240b may be located so as to be aligned with a second reference line 301b. The first reference line 301a and the second reference line 301b may intersect each other, and the intersection angle may be above 0 degrees and below 180 degrees. For example, the intersection angle may be 90 degrees.

The first reference line 301a may be a virtual straight line that connects the center of the first OIS position sensor 240a, which is mounted on the circuit board 250 and is located in the recess 215a of the base 210, to a center line 301 (see FIG. 12), and the second reference line 301b may be a virtual straight line that connects the center of the second OIS position sensor 240b, which is mounted on the circuit board 250 and is located in the recess 215b of the base 210, to the center line 301 (see FIG. 12). For example, the center line 301 may be a virtual line that is parallel to the optical axis and passes through the center point of the bore. Here, the bore may be the bore of any one of the base 210, the circuit board 250, the bobbin 110 and the housing 140.

The first and second OIS position sensors 240a and 240b may be disposed on the first surface or the second surface of the circuit board 250. In addition, the first and second capacitors 310 and 320 may be disposed on the first surface or the second surface of the circuit board 250. At this time, the first surface may be the lower surface of the circuit board 250, which faces the upper surface of the base 210, and the second surface may be the upper surface of the circuit board 250, which is opposite the first surface.

For example, all of the first and second OIS position sensors 240a and 240b and the first and second capacitors 310 and 320 may be disposed on the lower surface of the circuit board 250.

Alternatively, the first and second OIS position sensors 240a and 240b may be disposed on the lower surface of the circuit board 250, whereas the first and second capacitors 310 and 320 may be disposed on the upper surface of the circuit board 250. Alternatively, the opposite configuration may be possible.

Each of the first and second capacitors 310 and 320 may be disposed or mounted on the circuit board 250 in a chip form, without being limited thereto.

In another embodiment, the first and second capacitors 310 and 320 may be included in the circuit board 250. For example, the circuit board 250 may include the first capacitor 310, which includes a first conductive layer, a second conductive layer, and a first insulation layer (e.g. dielectrics) interposed between the first conductive layer and the second conductive layer, and the second capacitor 320, which includes a third conductive layer, a fourth conductive layer, and a second insulation layer interposed between the third conductive layer and the fourth conductive layer.

The first capacitor 310 may be connected in parallel to an output end of the first OIS position sensor 240a, and the second capacitor 320 may be connected in parallel to an output end of the second OIS position sensor 240b. The first capacitor 310 may perform the time delay of a first output signal of the first OIS position sensor 240a, and the second capacitor 320 may perform the time delay of a second output signal of the second OIS position sensor 240b.

Figure 15:
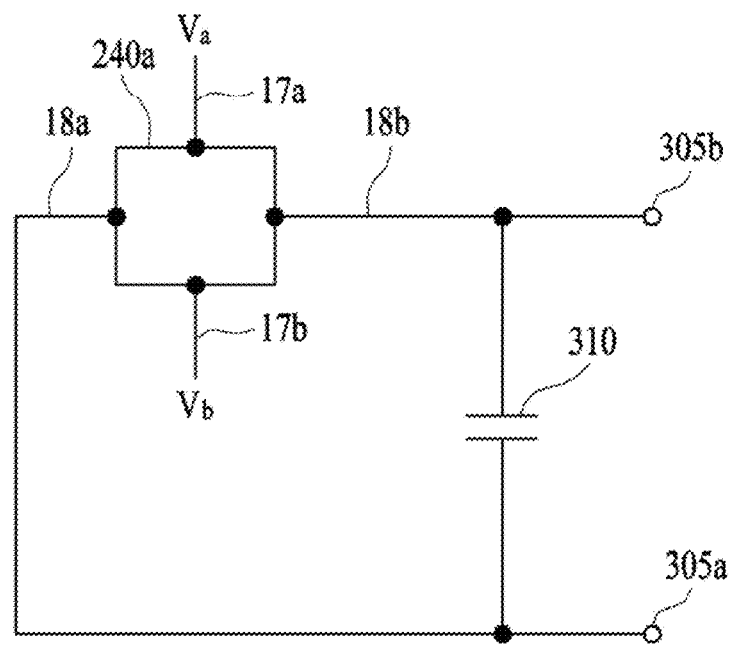
FIG. 15 is a circuit diagram illustrating the electrical connection of the first capacitor and the first OIS position sensor.

FIG. 15 is a circuit diagram illustrating the electrical connection of the first capacitor 310 and the first OIS position sensor 240a.

Referring to FIG. 15, the first OIS position sensor 240a may include a first input terminal 17a to which a first input signal Va is provided, a second input terminal 17b to which a second input signal Vb is provided, a first output terminal 18a, and a second output terminal 18b.

The first capacitor 310 is connected in parallel to first and second output terminals 18a and 18b of the first OIS position sensor 240a. That is, one end 305a of the first capacitor 310 may be connected to the first output terminal 18a, and the other end 305b of the first capacitor 310 may be connected to the second output terminal 18b.

The first capacitor 310 may perform the time delay of signals output from the output terminals 18a and 18b of the first OIS position sensor 240a. Thus, the output signals of both the ends 305a and 305b of the first capacitor 310 may be time-delayed signals of the output signals of the first OIS position sensor 240a.

Figure 16:
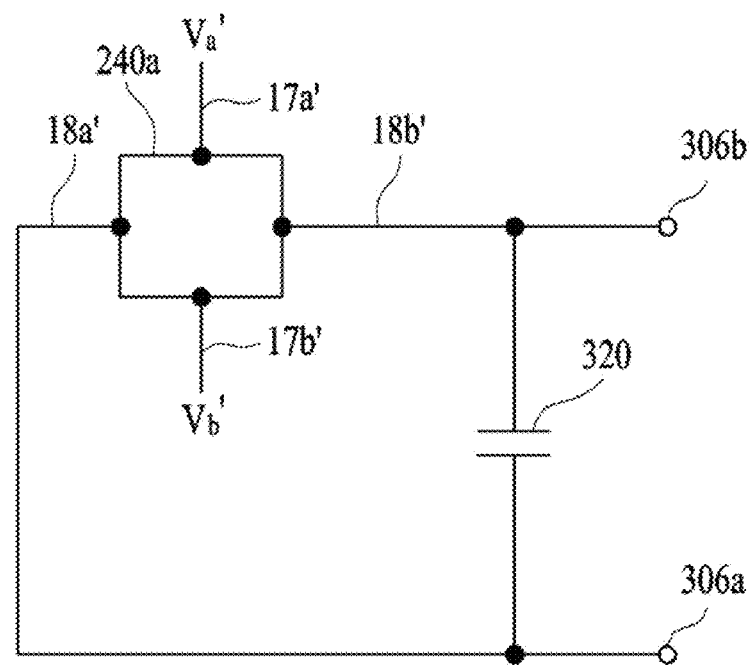
FIG. 16 is a circuit diagram illustrating the electrical connection of the second capacitor and the second OIS position sensor.

FIG. 16 is a circuit diagram illustrating the electrical connection of the second capacitor 320 and the second OIS position sensor 240b.

Referring to FIG. 16, the second OIS position sensor 240b may include a first input terminal 17a' to which a first input signal Va' is provided, a second input terminal 17b' to which a second input signal Vb' is provided, a first output terminal 18a', and a second output terminal 18b'. For example, Va is equal to Va', and Vb is equal to Vb'.

The second capacitor 320 is connected in parallel to first and second output terminals 18a' and 18b' of the second OIS position sensor 240b. That is, one end 306a of the second capacitor 320 may be connected to the first output terminal 18a', and the other end 306b of the second capacitor 320 may be connected to the second output terminal 18b'.

The second capacitor 320 may perform the time delay of signals output from the output terminals 18a' and 18b' of the second OIS position sensor 240b. Thus, the output signals of both the ends 306a and 306b of the second capacitor 320 may be time-delayed signals of the output signals of the second OIS position sensor 240b.

The first capacitor 310 and the second capacitor 320 may have the same capacitance, without being limited thereto. For example, the capacitance of each of the first capacitor 310 and the second capacitor 320 may be within a range from 0.1 µf to 1 µF. When the capacitance of each of the first capacitor 310 and the second capacitor 320 is below 0.1 µF, it is impossible to sufficiently acquire the time delay effect for alleviating the magnetic induction of the second coil 230. On the other hand, when the capacitance of each of the first capacitor 310 and the second capacitor 320 exceeds 1 µF, OIS control in a desired frequency band is impossible because it has an effect on a primary resonant frequency in the frequency response of the suppression ratio.

As exemplarily illustrated in FIG. 12, because the OIS position sensors 240a and 240b and the second coil 230 may be arranged close to each other, the OIS position sensors 240a and 240b may be affected by magnetic force induced by the second coil 230. Thereby, the OIS position sensors 240a and 240b may accurately sense the strength of magnetic force of the first magnet 130 depending on the movement of the housing 140. This may result in deterioration in the reliability of hand tremor compensation.

The performance and stability of OIS control for hand tremor compensation may be verified via analysis of the frequency response, i.e. analysis of a gain margin and a phase margin by a frequency response analyzer.

For example, the performance of OIS control may be measured by the suppression ratio. The suppression ratio may be defined as a log value (20 log(Y)) of the ratio of an output signal OUT of the OIS sensor to an input signal INPUT applied to the second coil 230 (Y=OUT/INPUT).

OIS control may exhibit the best performance when the actual movement of the housing 140 coincides with physical movement.

Figure 17A:
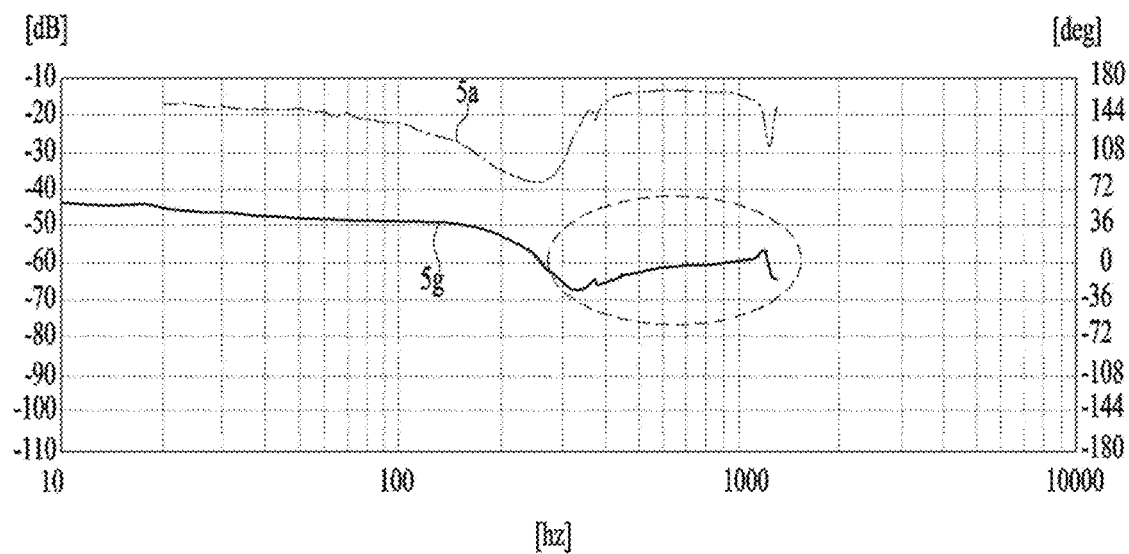
FIG. 17A is a view illustrating the frequency response of the suppression ratio of the OIS position sensor when the first and second capacitors are not provided.
Figure 17B:
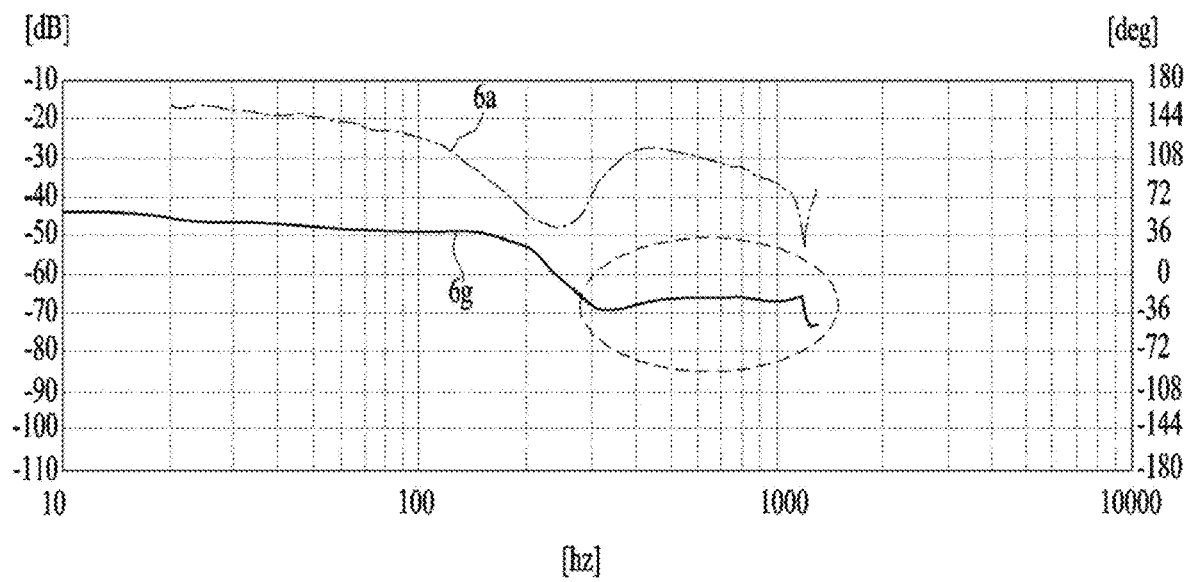
FIG. 17B is a view illustrating the frequency response of the suppression ratio of the OIS position sensor when the first and second capacitors are provided.

FIG. 17A is a view illustrating the frequency response of the suppression ratio of the OIS position sensor 240a when the first and second capacitors 310 and 320 are not provided, and FIG. 17B is a view illustrating the frequency response of the suppression ratio of the OIS position sensor 240a when the first and second capacitors 310 and 320 are provided. "5a" and "6a" designate phase graphs, and "5g" and "6g" designate gain graphs.

Referring to FIG. 17A, it can be appreciated that gain increases, and thus a gain margin decreases in a frequency range (e.g. from 200 Hz to 1100 Hz) of a secondary resonant frequency or more due to the magnetic induction of the second coil 230. For example, it can be appreciated that gain is −60 dB or more in a frequency band from 700 Hz to 1100 Hz.

Referring to FIG. 17B, it can be appreciated that an increase in gain in a higher resonant frequency range (e.g. from 200 Hz to 1100 Hz) above a primary resonant frequency is reduced compared to FIG. 17A. For example, it can be appreciated that a gain is below −60 dB in a frequency band from 700 Hz to 1100 Hz.

As the capacitors 310 and 320 connected in parallel to both ends of the respective output terminals of the OIS position sensors 240a and 240 perform the time-delay of output signals of the OIS position sensors 240a and 240b, the embodiment may restrict an increase in gain in a frequency band (e.g. from 200 Hz to 1100 Hz) of a secondary resonant frequency or more attributable to the magnetic induction of the second coil 230, and may inhibit deterioration in the reliability of hand tremor compensation.

Figure 18:
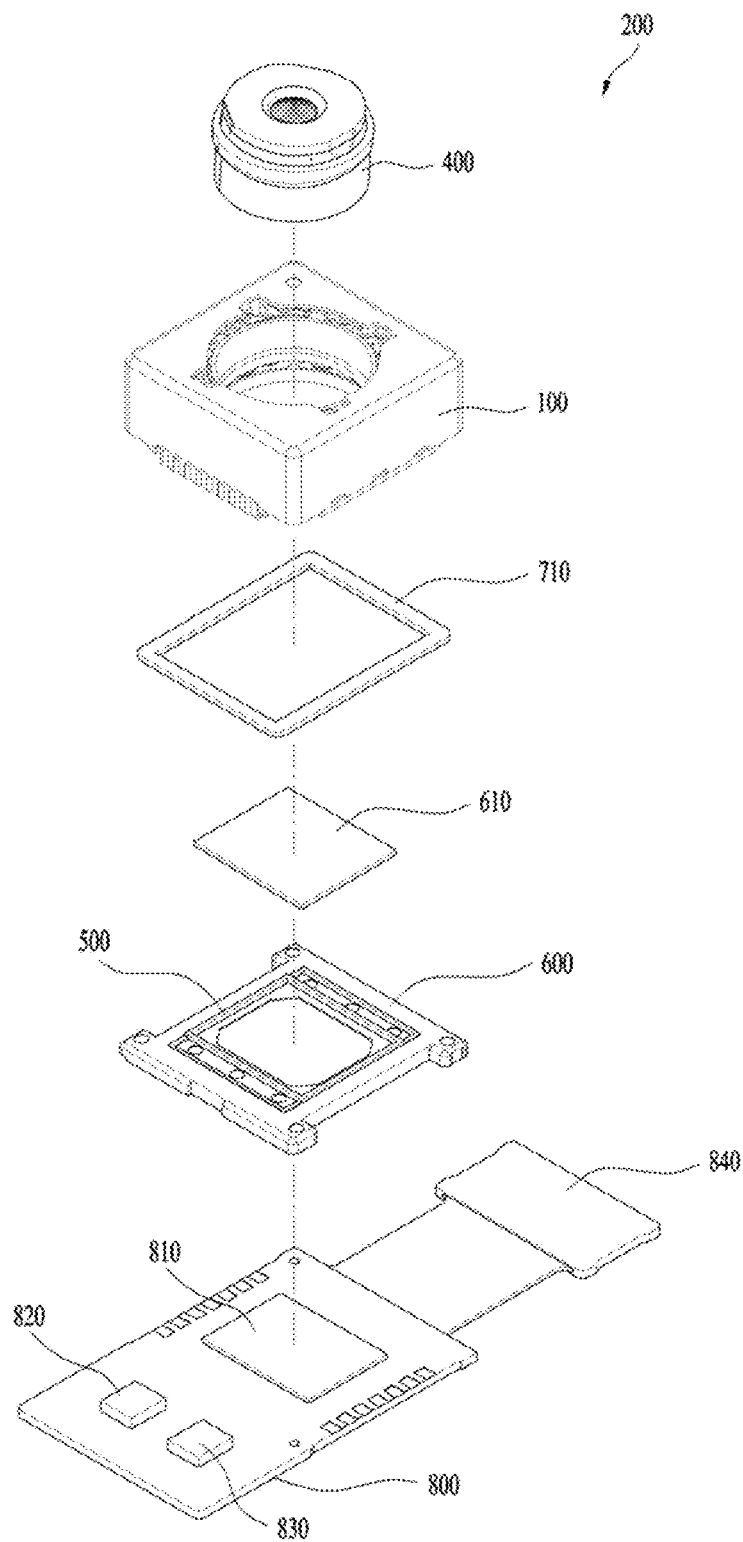
FIG. 18 is an exploded perspective view illustrating a camera module according to an embodiment.

FIG. 18 is an exploded perspective view illustrating a camera module 200 according to an embodiment.

Referring to FIG. 18, the camera module 200 may include a lens barrel 400, a lens moving apparatus 100, an adhesive member 710, a filter 610, a first holder 600, a second holder 800, an image sensor 810, a motion sensor 820, a hand tremor controller 830, and a connector 840.

The lens barrel 400 may be mounted in the bobbin 110 of the lens moving apparatus 100.

The first holder 600 may be located under the base 210 of the lens moving apparatus 100. The filter 610 may be mounted on the first holder 600, and the first holder 600 may have a raised portion 500 on which the filter 610 is seated.

The adhesive member 710 may couple or attach the base 210 of the lens moving apparatus 100 to the first holder 600. In addition to the attachment function described above, the adhesive member 710 may serve to inhibit impurities from entering the lens moving apparatus 100.

For example, the adhesive member 710 may be, for example, epoxy, thermosetting adhesive, or ultraviolet-curing adhesive.

The filter 610 may serve to inhibit light within a specific frequency band having passed through the lens barrel 400 from being introduced into the image sensor 810. The filter 610 may be an infrared-light blocking filter, without being limited thereto. At this time, the filter 610 may be oriented parallel to the x-y plane.

A region of the first holder 600 in which the filter 610 is mounted may be provided with a bore to allow the light having passed through the filter 610 to be introduced into the image sensor 810.

The second holder 800 may be disposed under the first holder 600, and the image sensor 810 may be mounted on the second holder 600. The light having passed through the filter 610 is introduced into the image sensor 810 so as to form an image on the image sensor 810.

The second holder 800 may include, for example, various circuits, devices, and a controller in order to convert the image, formed on the image sensor 810, into electrical signals to thereby transmit the same to an external apparatus.

The second holder 800 may take the form of a circuit board on which the image sensor 810 may be mounted, a circuit pattern may be formed, and various devices are coupled.

The image sensor 810 may receive an image included in light introduced through the lens moving apparatus 100, and may convert the received image into electrical signals.

The filter 610 and the image sensor 810 may be spaced apart from each other so as to be opposite to each other in the first direction.

The motion sensor 820 may be mounted on the second holder 800, and may be electrically connected to the hand tremor controller 830 through the circuit pattern formed on the second holder 800.

The motion sensor 820 outputs rotational angular speed information regarding the movement of the camera module 200. The motion sensor 820 may take the form of a dual-axis or triple-axis gyro sensor, or an angular speed sensor.

The hand tremor controller 830 may be mounted on the second holder 800, and may be electrically connected to the second position sensor 240 and the second coil 230 of the lens moving apparatus 100. For example, the second holder 800 may be electrically connected to the circuit board 250 of the lens moving apparatus 100, and the hand tremor controller 820 mounted on the second holder 800 may be electrically connected to the second position sensor 240 and the second coil 230 through the circuit board 250.

The hand tremor controller 830 may output a drive signal required to perform hand tremor compensation on the OIS movable unit of the lens moving apparatus 100 based on signals output from the first and second OIS position sensors 240a and 240b of the lens moving apparatus 100.

The hand tremor controller 830 may include a first amplifier, which amplifies an output signal of the first OIS position sensor 240a (e.g. differential amplification), and a second amplifier, which amplifies an output signal (e.g. differential amplification) of the second OIS position sensor 240b. Each of the first amplifier and the second amplifier may be formed into, for example, a differential calculation amplifier, without being limited thereto.

Figure 19:
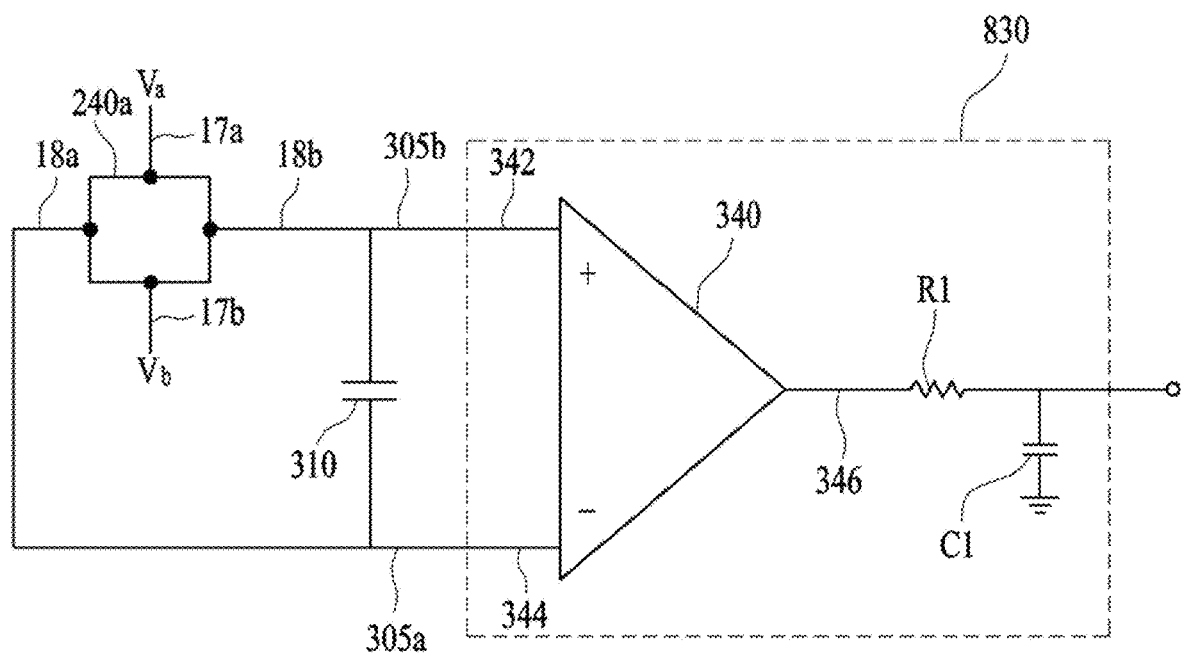
FIG. 19 is a view illustrating the connection relationship of the first OIS position sensor, the first capacitor, and a first amplifier of a hand tremor controller.

FIG. 19 is a view illustrating the connection relationship of the first OIS position sensor 240a, the first capacitor 310, and the first amplifier of the hand tremor controller 830.

Referring to FIG. 19, the hand tremor controller 830 may include a first amplifier 340, a resistor R1, and a capacitor C1. In another embodiment, the resistor R1 and the capacitor C1 may be omitted.

One end 305a of the first capacitor 310 may be connected to a first input terminal 344 of the first amplifier 340 of the hand tremor controller 830, and the other end 305b of the first capacitor 310 may be connected to a second input terminal 342 of the first amplifier 340 of the hand tremor controller 830.

The first and second output terminals 18a and 18b of the first OIS position sensor 240a, both the ends 305a and 305b of the first capacitor 310, and the first and second input terminals 344 and 342 of the first amplifier 340 may be connected in parallel to one another.

The above description of FIG. 19 may also be applied to the connection relationship of the second OIS position sensor 240b, the second capacitor 320, and the second amplifier of the hand tremor controller 830.

One end 306a of the second capacitor 320 may be connected to a first input terminal of the second amplifier of the hand tremor controller 830, and the other end 306b of the second capacitor 320 may be connected to a second input terminal of the second amplifier of the hand tremor controller 830.

The first and second output terminals 18a' and 18b' of the second OIS position sensor 240b, both the ends 306a and 306b of the second capacitor 320, and the first and second input terminals of the second amplifier may be connected in parallel to one another.

The connector 840 may have a port for the electrical connection of the second holder 800 and the electrical connection of an external appliance.

In FIG. 18, the first and second capacitors 310 and 320 are included in the lens moving apparatus 100, without being limited thereto.

In another embodiment, the first and second capacitors 310 and 320 may be disposed or mounted on the second holder 800 of the camera module 200. The first and second capacitors 310 and 320 mounted on the second holder 800 may be electrically connected to the circuit board 250 of the lens moving apparatus 100 through a circuit pattern of the second holder 800, and may be connected in parallel to the output terminals of the OIS position sensors 240a and 240b through the circuit board 250.

In addition, the first and second input terminals of the first amplifier of the hand tremor controller 830 may be connected in parallel to both ends of the first capacitor 310 through the circuit pattern of the second holder 800. In addition, the first and second input terminals of the second amplifier of the hand tremor controller 830 may be connected in parallel to both ends of the second capacitor 320 through the circuit pattern of the second holder 800.

Figure 20:
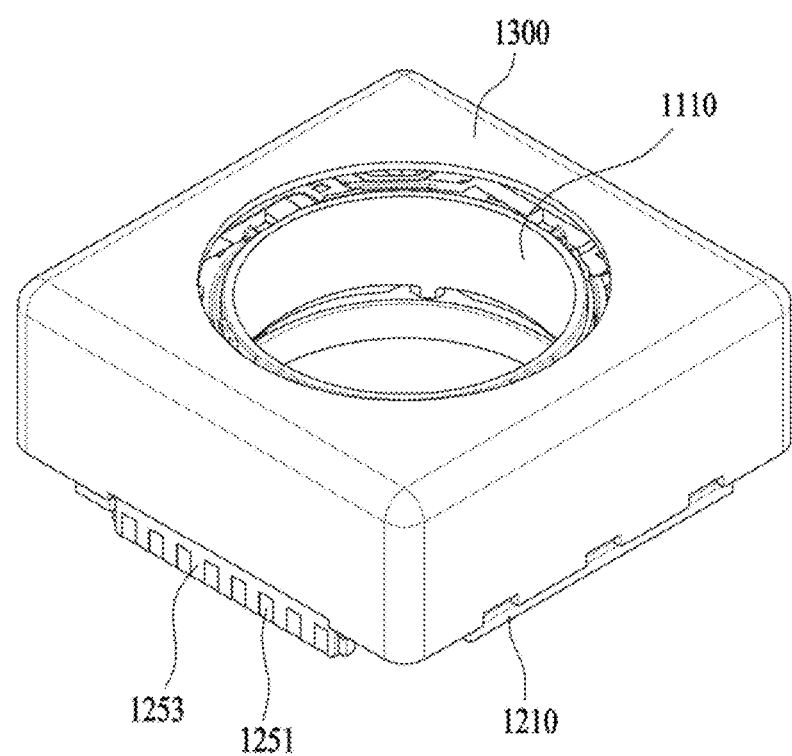
FIG. 20 is a perspective view illustrating a lens moving apparatus according to an embodiment.
Figure 21:
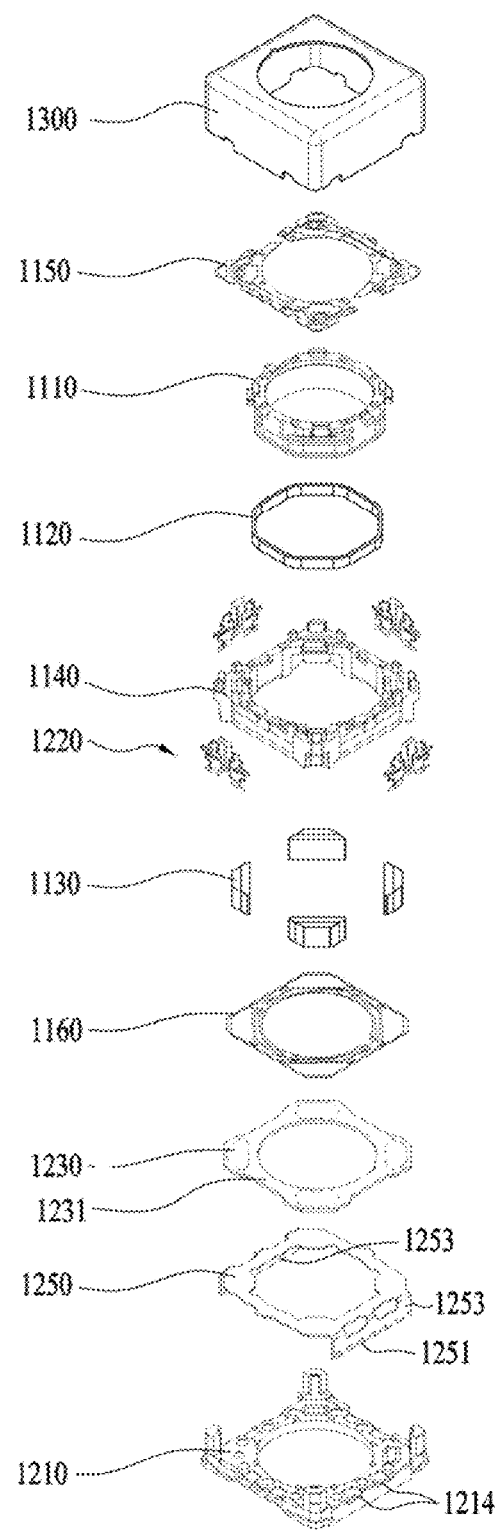
FIG. 21 is an exploded perspective view illustrating the lens moving apparatus according to the embodiment.

FIG. 20 is a perspective view illustrating a lens moving apparatus according to an embodiment, and FIG. 21 is an exploded perspective view illustrating the lens moving apparatus according to the embodiment.

As exemplarily illustrated in FIG. 21, the lens moving apparatus according to the embodiment may include a movable unit. At this time, the movable unit may perform auto-focusing and hand tremor compensation. The movable unit may include a bobbin 1110, a first coil 1120, a first magnet 1130, a housing 1140, an upper elastic member 1150, and a lower elastic member 1160.

The bobbin 1110 may be provided on the outer circumferential surface thereof with the first coil 1120, which is located inside the first magnet 1130. The first coil 1120 may be installed in the inner space of the housing 140 so as to be reciprocally movable in the first direction via electromagnetic interaction between the first magnet 1130 and the first coil 1120. The first coil 1120 may be installed on the outer circumferential surface of the bobbin 1110 so as to electromagnetically interact with the first magnet 1130.

In addition, the bobbin 1110 may be elastically supported by the upper and lower elastic members 1150 and 1160, thereby performing auto-focusing by moving in the first direction.

The bobbin 1110 may include a lens barrel (not illustrated) in which at least one lens is installed. The lens barrel may be coupled in various manners within the bobbin 1110.

For example, female screw-threads may be formed on the inner circumferential surface of the bobbin 1110, and male screw-threads may be formed on the outer circumferential surface of the lens barrel so as to correspond to the female screw-threads. Through screwing, the lens barrel may be coupled to the bobbin 1110.

However, the embodiment is not limited thereto, and instead of forming the screw-threads on the inner circumferential surface of the bobbin 1110, the lens barrel may be directly fixed inside the bobbin 1110 by other methods excluding screwing. Alternatively, at least one lens may be integrally formed with the bobbin 1110 without the lens barrel.

The lens coupled to the lens barrel may be configured as one sheet, or two or more lenses may configure an optical system.

Auto-focusing may be controlled based on the direction of current, and may be implemented as the bobbin 1110 moves in the first direction. For example, the bobbin 1110 may move upward from the initial position thereof when forward current is applied, and the bobbin 1110 may move downward from the initial position thereof when reverse current is applied. Alternatively, the distance by which the bobbin 1110 moves in a given direction may be increased or reduced by adjusting the quantity of current in a given direction.

The bobbin 1110 may be provided on the upper surface and the lower surface thereof with a plurality of upper support bosses and lower support bosses. The upper support bosses may have a cylindrical or prismatic shape, and may serve to couple and fix the upper elastic member 1150. The lower support bosses may have a cylindrical or prismatic shape, and may serve to couple and fix the lower elastic member 1160.

At this time, the upper elastic member 1150 may have through-holes corresponding to the upper support bosses, and the lower elastic member 1160 may have through-holes corresponding to the lower support bosses. The support bosses and the through-holes may be fixedly coupled to each other via thermal bonding or an adhesive such as, for example, epoxy.

The housing 1140 may take the form of a hollow column to support the first magnet 1130, and may have an approximately square shape. The first magnet 1130 and the support member 1220 may be coupled respectively to the side surface portions of the housing 1140.

In addition, as described above, the bobbin 1110 may be provided within the housing 1140 so as to move in the first direction by being guided by the elastic members 1150 and 1160. In the embodiment, the first magnet 1130 may be located on the corner of the housing 1140, and the support member 1220 may be disposed on the side surface of the housing 1140.

The upper elastic member 1150 and the lower elastic member 1160 may elastically support the upward movement and/or lower movement of the bobbin 1110 in the first direction. The upper elastic member 1150 and the lower elastic member 1160 may be leaf-springs.

The upper elastic member 1150, as exemplarily illustrated in FIG. 21, may include two upper elastic members separated from each other. Through this bisected configuration, the respective divided parts of the upper elastic member 1150 may receive current of different polarities or different powers. In addition, in an alternative embodiment, the lower elastic member 1160 may be divided into two parts, and the upper elastic member 1150 may have an unitary configuration.

Meanwhile, the upper elastic member 1150, the lower elastic member 1160, the bobbin 1110, and the housing 1140 may be assembled with one another via, for example, thermal bonding and/or using, for example, an adhesive. At this time, for example, after being fixed via thermal bonding, the adhesive may be used to complete the fixing process.

The base 1210 may be disposed below the bobbin 1110, and may have an approximately square shape. A circuit board 1250 may be seated on the base 1210, and the lower end of the support member 1220 may be fixed to the base 1210.

In addition, a support member seating recess 1214 may be formed at the upper surface of the base 1210 so that a lower portion of the support member 1220 is inserted into the support member seating recess 1214. An adhesive may be applied to the support member seating recess 1214 so as to immovably fix the support member 1220.

The surface of the base 1210, which faces the portion of the circuit board 1250 provided with a terminal surface 1253, may be provided with a support recess, which is sized to correspond to the terminal surface 1253. The support recess may be indented at a given depth from the outer circumferential surface of the base 1210, so as to inhibit the portion provided with the terminal surface 1253 from protruding outward, or to adjust the distance by which the portion provided with the terminal surface 1253 protrudes.

The support member 1220 may be disposed on the side surface of the housing 1140, and may be coupled at the upper end thereof to the housing 1140 and at the lower end thereof to the base 1210. The support member 1220 may support the bobbin 1110 and the housing 1140 so that the bobbin 1110 and the housing 1140 are movable in the second direction and the third direction, which are perpendicular to the first direction. In addition, the support member 1220 may be electrically connected to the first coil 1120.

The support member 1220 according to the embodiment is located on each outer side surface of the square housing 1140, and therefore total four support members may be symmetrically installed. However, the embodiment is not limited thereto, and two support members may be provided on each straight surface so that total eight support members are provided.

In addition, the support member 1220 may be electrically connected to the upper elastic member 1150, or may be electrically connected to the straight surface of the upper elastic member 1150.

In addition, because the support member 1220 is formed separately from the upper elastic member 1150, the support member 1220 and the upper elastic member 1150 may be electrically connected to each other using, for example, a conductive adhesive or solders. Accordingly, the upper elastic member 1150 may apply current to the first coil 1120 through the support member 1220 electrically connected thereto.

The support member 1220 of the embodiment may include a first fixing portion 1221 (see FIG. 22), which may fix the support member 1220 to the lower portion of the side surface of the housing 1140. The lens moving apparatus having the first fixing portion 1221 may restrict the tilting of the bobbin 1110 and/or the housing 1140 when performing hand tremor compensation. The detailed configuration of the support member 1220 will be described below with reference to, for example, FIG. 22.

Meanwhile, FIG. 21 illustrates a plate-shaped support member 1220 according to one embodiment, without being limited thereto. That is, the support member may take the form of a wire.

The second coil 1230 may perform hand tremor compensation by moving the housing 1140 in the second direction and/or the third direction via electromagnetic interaction with the first magnet 1130.

Here, the second direction and the third direction may include not only x-axis and y-axis directions, but also directions, which are substantially close to the x-axis and y-axis directions. In the embodiment, although the housing 1140 may move parallel to the x-axis and the y-axis in terms of driving, the housing 1140 may also move slightly obliquely relative to the x-axis and the y-axis when moved while being supported by the support member 1220.

In addition, it is necessary to install the first magnet 1130 at a position corresponding to the second coil 1230.

The second coil 1230 may be located so as to be opposite to the first magnet 1130 fixed to the housing 1140. In one embodiment, the second coil 1230 may be located outside the first magnet 1130. Alternatively, the second coil 1230 may be spaced apart downward from the first magnet 1130 by a given distance.

According to the embodiment, total four second coils 1230 may be installed on four corners of a circuit member 1231, without being limited thereto. Alternatively, only two second coils including one second-direction second coil and one third-direction second coil may be installed, and four or more second coils may be installed.

In the embodiment, a circuit pattern may be formed into the second coil 1230 on the circuit member 1231 and an additional second coil may be disposed above the circuit member 1231, without being limited thereto. Alternatively, only the second coil 1230 may be disposed above the circuit member 1231 without the circuit pattern in the form of the second coil 1230 on the circuit member 1231.

Alternatively, the second coil 1230 may be formed by winding a wire in a donut shape, or may be configured as an FP coil, so as to be electrically connected to the circuit board 1250.

The second coil 1230 may be disposed above the base 1210 and below the housing 1140. At this time, the circuit member 1231 including the second coil 1230 may be installed on the upper surface of the circuit board 1250, which is disposed above the base 1210.

However, the embodiment is not limited thereto, and the second coil 1230 may come into close contact with the base 1210, or may be spaced apart from the base 1210 by a given distance. The second coil 1230 may be formed on a separate board, and in turn the board may be stacked on and connected to the circuit board 1250.

The circuit board 1250 may be coupled to the upper surface of the base 1210. As exemplarily illustrated in FIG. 21, the circuit board 1250 may have a through-hole or recess at a position corresponding to the support member seating recess 1214 so as to expose the support member seating recess 1214.

The circuit board 1250 may have the bent terminal surface 1253 on which a plurality of terminals 1251 is installed. The embodiment illustrates the circuit board 1250 provided with two bent terminal surfaces 1253.

The terminals 1251 may be arranged on the terminal surface 1253 so as to receive external power and to supply current to the first coil 1120 and the second coil 1230. The number of the terminals formed on the terminal surface 1253 may be increased or reduced according to the kind of required control constituent elements. In addition, the circuit board 1250 may have one terminal surface 1253, or may have three or more terminal surfaces.

A cover member 1300 may have an approximately box shape, may accommodate, for example, the movable unit, the second coil 1230, and a portion of the circuit board 1250, and may be coupled to the base 1210.

The cover member 1300 may inhibit damage to, for example, the movable unit, the second coil 1230, and the circuit board 1250 accommodated therein. In particular, the cover member 1300 may inhibit the outward leakage of an electromagnetic field, which is generated by, for example, the first magnet 1130, the first coil 1120, and the second coil 1230 accommodated therein, thereby enabling collimation of the electromagnetic field.

Figure 22:
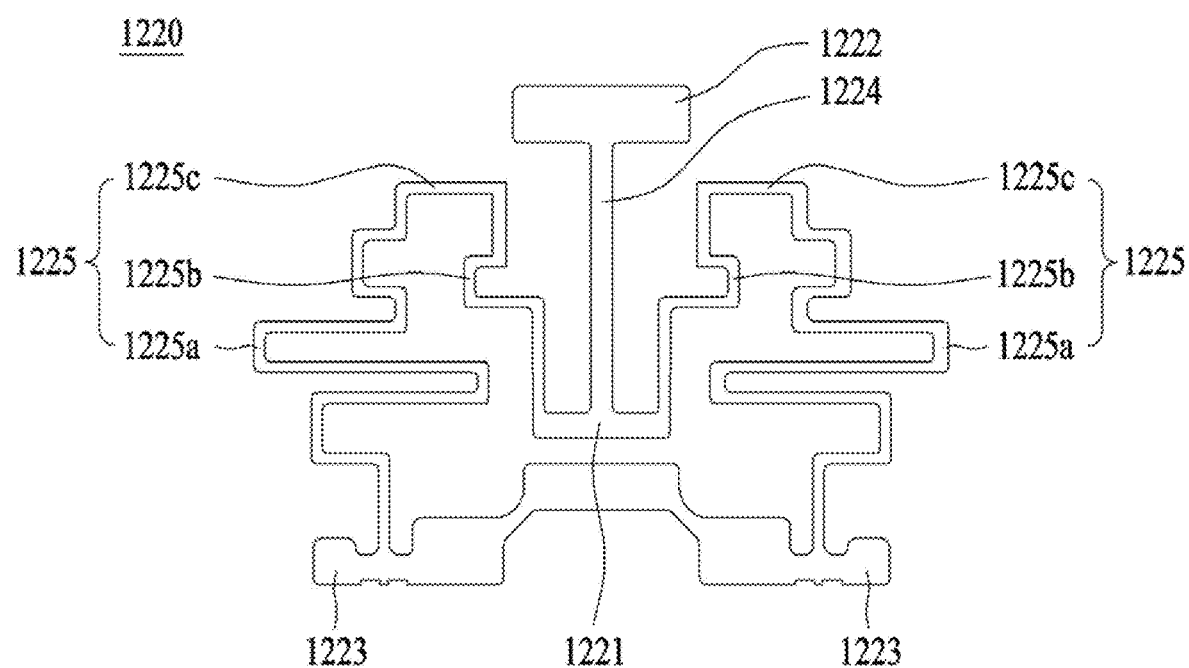
FIG. 22 is a front view illustrating a support member according to the embodiment.
Figure 23:
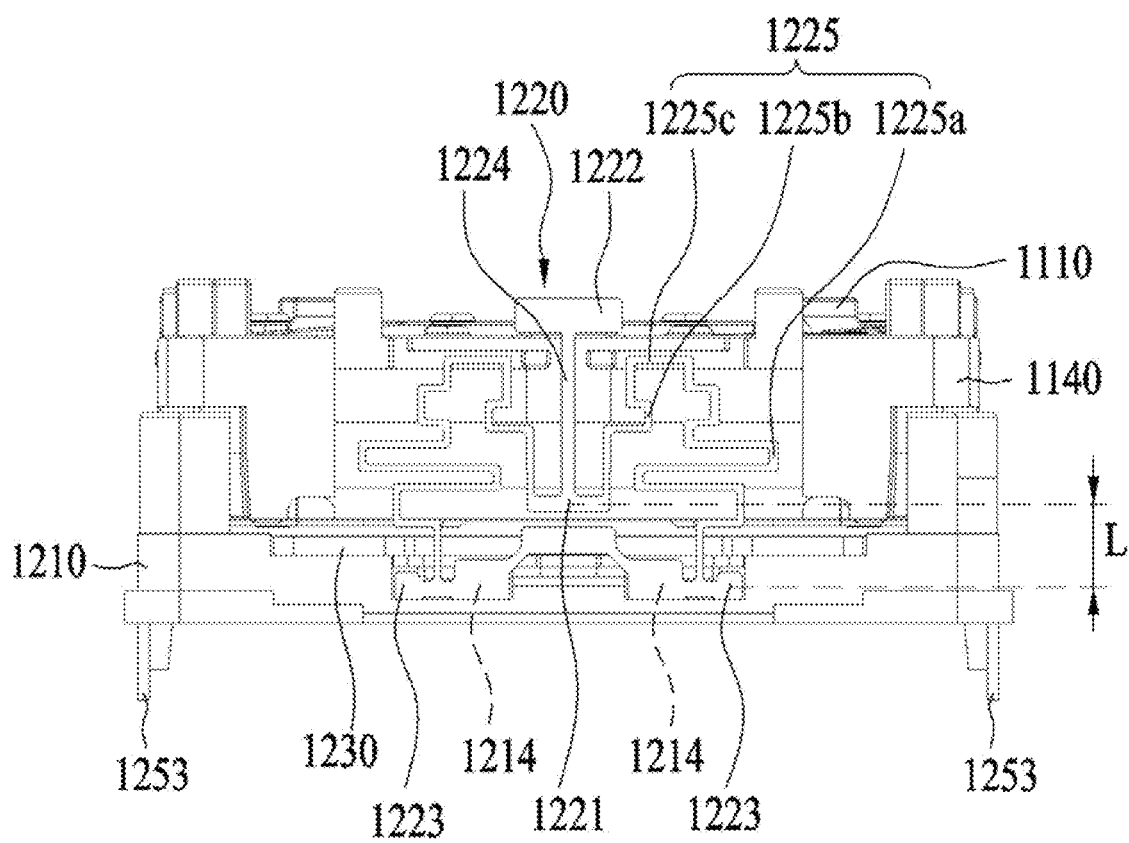
FIG. 23 is a front view illustrating a portion of the lens moving apparatus in which the support member is mounted according to the embodiment.
Figure 24:
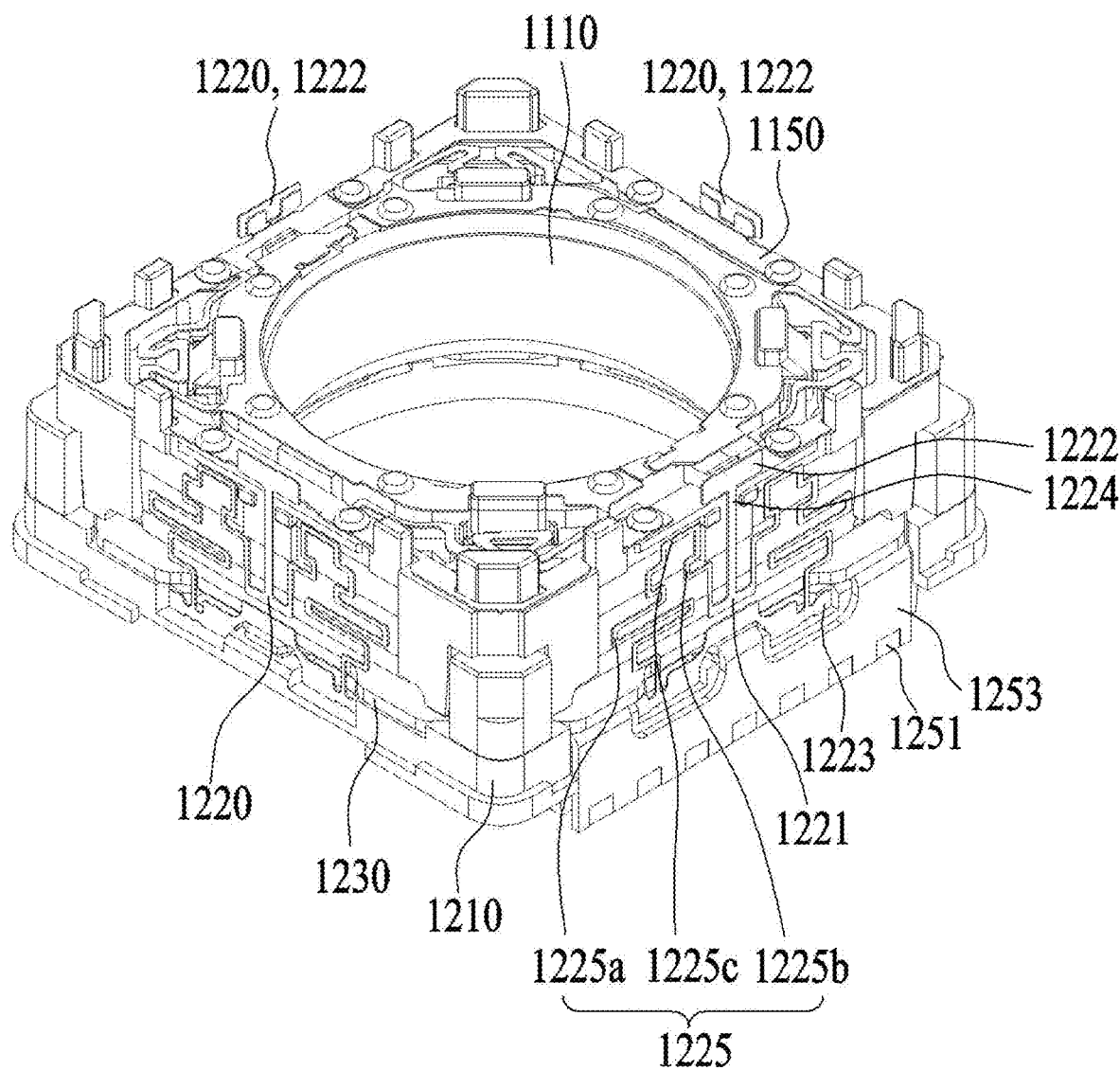
FIG. 24 is a perspective view illustrating a portion of the lens moving apparatus in which the support member is mounted according to the embodiment.

FIG. 22 is a front view illustrating the support member 1220 according to the embodiment, FIG. 23 is a front view illustrating a portion of the lens moving apparatus on which the support member 1220 is mounted according to the embodiment, and FIG. 24 is a perspective view illustrating a portion of the lens moving apparatus on which the support member 1220 is mounted according to the embodiment.

In the embodiment, the support member 1220 may have a plate shape. The upper end of the support member 1220 may be coupled to the upper end of the housing 1140, the middle portion of the support member 1220 may be fixed to the lower portion of the side surface of the housing 1140, and the lower end of the support member 1220 may be coupled to the base 1210.

Specifically, the support member 1220 may include a first fixing portion 1221, a first coupling portion 1222, a second coupling portion 1223, a first connection portion 1224, and an elastic-deformation portion 1225. At this time, the respective constituent elements of the support member 1220 may be integrally formed with one another.

The first fixing portion 1221 of the support member 1220 may be fixed to the lower portion of the side surface of the housing 1140. When the lens moving apparatus performs hand tremor compensation, the first fixing portion 1221 may serve to restrict the tilting of the bobbin 1110 and the housing 1140.

Upon hand tremor compensation, the bobbin 1110 and the housing 1140 may horizontally move in the second direction and the third direction, which are perpendicular to the first direction, and may tilt to the first direction during the horizontal movement thereof.

When the bobbin 1110 and the housing 1140 tilt, the auto-focusing and hand tremor compensation of the lens moving apparatus may be erroneous, which may deteriorate the quality of captured images. Therefore, it is necessary to appropriately restrict the occurrence of tilting.

The degree of tilting is proportional to the distance between the location at which the support member 1220 is fixed to the base 1210 and the location at which the support member 1220 is fixed to the housing 1140. Specifically, the degree of tilting is increased in proportion to the magnitude of moment applied to the bobbin 1110 and the housing 1140. The moment M may be represented by the following Equation.

$$M = F \times L$$

Here, F is force applied to the bobbin 1110 and the housing 1140, for example, force applied by an electromagnetic field, and L is the distance between the location at which the support member 1220 is fixed to the base 1210 and the location at which the support member 1220 is fixed to the housing 1140.

Accordingly, as the distance L is increased, the moment applied to the bobbin 1110 and the housing 1140 is increased. Such an increase in moment may increase the rotation of the bobbin 1110 and the housing 1140 about the location at which the support member 1220 is fixed to the base 1210, and consequently may increase tilting attributable to the rotation.

Thereby, because the moment applied to the bobbin 1110 and the housing 1140, and consequently, tilting attributable to the moment may be reduced as the distance L is reduced, the tilting of the bobbin 1110 and the housing 1140 may be appropriately adjusted by appropriately adjusting the distance L.

In this way, the support member 1220 may include the first fixing portion 1221, fixed to the housing 1140, between the first coupling portion 1222 and the second coupling portion 1223, thereby reducing the distance L. It may be desirable that the first fixing portion 1221 be fixed to the lower portion of the housing 1140 in order to further reduce the distance L.

In this case, the distance from the location at which the support member 1220 is fixed to the base 1210, i.e. from the second coupling portion 1223 to the first fixing portion 1221 may be "L". In addition, the support member 1220 may have the configuration described below in order to allow the first fixing portion 1221 to be fixed to the lower portion of the housing 1140.

The first fixing portion 1221 may be the portion of the support member 1220, which is fixed to the lower portion of the side surface of the housing 1140, and may be located on the lower end of the first connection portion 1224. At this time, the first fixing portion 1221 may be integrally coupled to the first connection portion 1224 and the elastic-deformation portion 1225, and may serve to connect the first connection portion 1224 and the elastic-deformation portion 1225 to each other.

The first fixing portion 1221 may be bonded using an adhesive to the lower portion of the side surface of the housing 1140 to thereby be fixed to the housing 1140. The adhesive used in bonding may be any one of various kinds of adhesives such as, for example, epoxy, thermosetting adhesive, or light-curing adhesive.

In addition, the resulting bond may serve as a damper, which alleviates vibrations generated when the housing 1140 and the bobbin 1110 move in the second direction and the third direction.

Meanwhile, although not illustrated, the damper, which alleviates vibrations of the housing 1140 and the bobbin 1110, may have any of various shapes excluding the bond for attaching the first fixing portion 1221 to the housing 1140. For example, the damper may be provided on a curved portion of the side surface of the housing 1140, i.e. a corner portion so as to come into contact with the base 1210, thereby alleviating vibrations of the housing 1140 and the bobbin 1110.

In addition, although not illustrated, so long as the damper does not cause malfunction of the support member 1220, the damper may be provided on an appropriate portion of the support member 1220 so as to be bonded to the housing 1140.

In the embodiment, total four support members 1220 may be provided, and each support member 1220 may include one first fixing portion 1221. The respective support members 1220 may be radially arranged about the center of the housing 1140. Thus, the lens moving apparatus of the embodiment may include total four first fixing portions 1221.

The first coupling portion 1222 is coupled to the housing 1140 at the upper end of the housing 1140. As exemplarily illustrated in FIG. 24, for the coupling of the first coupling portion 1222, the housing 1140 may be provided on the upper end thereof with a protrusion, which is opposite to the first coupling portion 1222.

The first coupling portion 1222 and the protrusion may be bonded to each other using, for example, an adhesive. As such, the first coupling portion 1222 may be fixed or coupled to the protrusion of the housing 1140. At this time, the adhesive may be any one of various kinds of adhesives such as, epoxy, thermosetting adhesive, and light-curing adhesive.

Because the first coupling portion 1222 requires a surface area for bonding, the first coupling portion 1222 may appropriately take the form of a plate having a given width in the vertical direction and the lateral direction, unlike the first connection portion 1224 or the elastic-deformation portion 1225.

The second coupling portion 1223 is coupled to the base 1210. As exemplarily illustrated in FIG. 23, the second coupling portion 1223 may be seated in the support member seating recess 1214 formed at the upper surface of the base 1210, and may be bonded using, for example, adhesive, thereby being fixed or coupled to the base 1210. Likewise, the adhesive may be any one of various kinds of adhesives, such as epoxy, thermosetting adhesive, and light-curing adhesive.

Meanwhile, as exemplarily illustrated in FIG. 23, in order to be coupled to a plurality of elastic-deformation portions 1225, which are symmetrically arranged, a pair of symmetrical second coupling portions 1223 may be provided. The second coupling portions 1223 may be fixed or coupled to a pair of symmetrical support member seating recesses 1214.

The second coupling portion 1223 may appropriately have a shape corresponding to the shape of the support member seating recess 1214 so as to be seated in the support member seating recess 1214. That is, the support member seating recess 1214 may have any of various vertical widths so as to inhibit the second coupling portion 1223 from being easily separated therefrom. As such, the second coupling portion 1223 may be shaped so as to correspond to the shape of the support member seating recess 1214.

The first connection portion 1224 may extend from the first coupling portion 1222. At this time, one end of the first connection portion 1224, i.e. the lower end may be coupled to the first fixing portion 1221. The first connection portion 1224 may serve to connect the first coupling portion 1222 and the first fixing portion 1221 to each other.

Accordingly, the upper end of the first connection portion 1224 may be integrally coupled to the first coupling portion 1222, and the lower end of the first connection portion 1224 may be integrally coupled to the first fixing portion 1221.

Because the first connection portion 1224 connects the first coupling portion 1222 and the first fixing portion 1221 to each other, as exemplarily illustrated in FIGS. 22 and 23, the first connection portion 1224 may appropriately take the form of an elongated plate-shaped bar having a small width in the lateral direction and a long length in the vertical direction.

The elastic-deformation portion 1225 may extend from the second coupling portion 1223. The elastic-deformation portion 1225 may be deformed when the bobbin 1110 and the housing 1140 move in the second direction or the third direction, but may elastically support the bobbin 1110 and the housing 1140 by restoration force thereof.

When the housing 1140 and the bobbin 1110 move in the second direction and the third direction, which are perpendicular to the first direction, the elastic-deformation portion 1225 may be elastically deformed in the direction in which the housing 1140 and the bobbin 1110 move, i.e. in the lateral direction of the support member 1220 and the vertical direction of the support member 1220.

With this configuration, the housing 1140 and the bobbin 1110 may move in the second direction and the third direction with substantially no variation in position with regard to the first direction excluding tilting, which may increase the accuracy of hand tremor compensation. This is based on the fact that the elastic-deformation portion 1225 is elastically deformable in the vertical direction of the support member 1220.

The elastic-deformation portion 1225, as exemplarily illustrated in FIGS. 22 and 23, may be integrally coupled at one end thereof to the first fixing portion 1221, and may be integrally coupled at the other end thereof to the second coupling portion 1223. At this time, a pair of symmetrical elastic-deformation portions 1225 may be provided.

In addition, the elastic-deformation portion 1225 may be shaped so as to extend upward from the first fixing portion 1221 and then again extend downward and be connected to the second coupling portion 1223, and thereafter be bent laterally at least one time.

With this configuration, the elastic-deformation portion 1225 may elastically support the movement of the housing 1140 and the bobbin 1110, and at this time, the first fixing portion 1221 may be fixed to the lower portion of the side surface of the bobbin 1110.

In addition, with this configuration, the elastic-deformation portion 1225 may be elastically deformed in the lateral direction of the support member 1220 and the vertical direction of the support member 1220. Specifically, the elastic-deformation portion 1225 may include a first bent portion 1225a, a second bent portion 1225b, and a second connection portion 1225c.

The first bent portion 1225a may protrude upward from the second coupling portion 1223, and may have at least one bent portion. The first bent portion 1225a may be easily elastically deformed in the first direction, the second direction, and third direction because of upwardly and laterally bent portions of the support member 1220.

The second bent portion 1225b may protrude upward from the first fixing portion 1221, and may have at least one bent portion. In the same manner as the first bent portion 1225a, the second bent portion 1225b may be easily elastically deformed in the first direction, the second direction, and third direction because of upwardly and laterally bent portions of the support member 1220.

For example, the number and shape of the bent portions of the first bent portion 1225a and the second bent portion 1225b may be appropriately selected in consideration of, for example, the material of the support member 1220, the required spring constant or rigidity of the support member 1220, and the structural relation with the lens moving apparatus.

The second connection portion 1225c may be longitudinally disposed in the lateral direction of the support member 1220, and may serve to connect the upper ends of the first bent portion 1225a and the second bent portion 1225b to each other.

Accordingly, the second connection portion 1225c may be integrally coupled at one end thereof to the first bent portion 1225a and may be integrally coupled at the other end thereof to the second bent portion 1225b.

Meanwhile, the first bent portion 1225a, the second bent portion 1225b, and the second connection portion 1225c may be integrally formed with one another via, for example, injection molding. Meanwhile, as described above, the first fixing portion 1221, the first coupling portion 1222, the second coupling portion 1223, the first connection portion 1224, and the elastic-deformation portion 1225, which constitute the support member 1220, may be integrally formed with one another via, for example, injection molding, whereby the entire support member 1220 may be formed into a unitary body.

Figure 25:
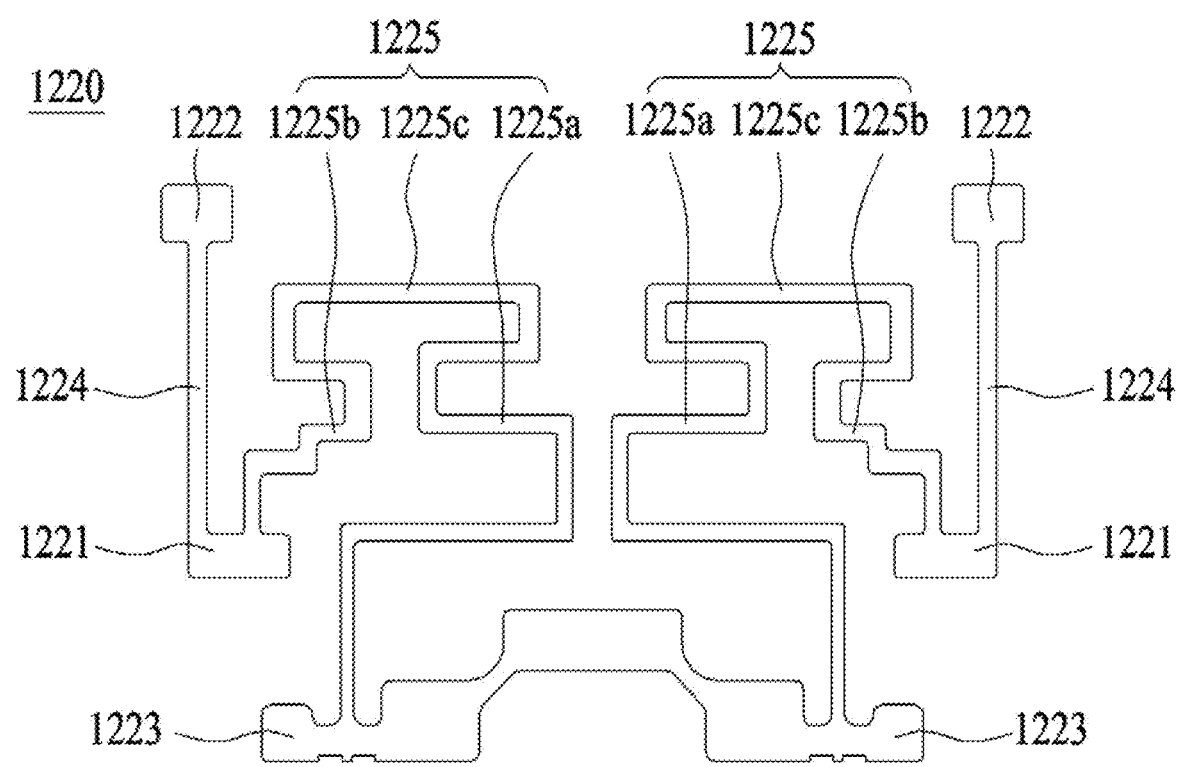
FIG. 25 is a front view illustrating the support member according to the embodiment.
Figure 26:
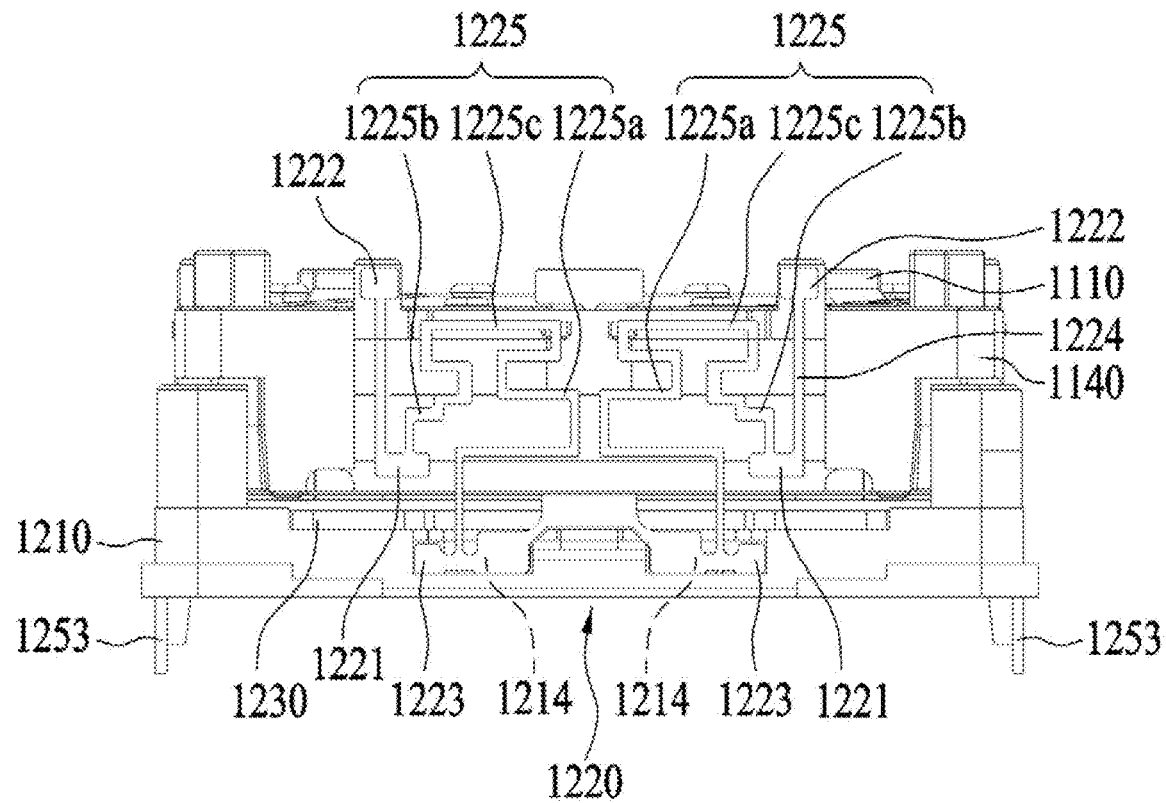
FIG. 26 is a front view illustrating a portion of the lens moving apparatus in which the support member is mounted according to the embodiment.

FIG. 25 is a front view illustrating the support member 1220 according to the embodiment. FIG. 26 is a front view illustrating a portion of the lens moving apparatus on which the support member 1220 is mounted according to the embodiment.

As exemplarily illustrated in FIGS. 25 and 26, the support member 1220 may be configured such that each of the first coupling portion 1222, the first connection portion 1224, and the first fixing portion 1221 consists of a pair of symmetrical members.

At this time, because a pair of second coupling portions 1223 is provided, the protrusion of the housing 1140, which is opposite to the second coupling portion 1223 and is bonded to the second coupling portion 1223, may be formed into a pair of protrusions, which are arranged on positions of the housing 1140 corresponding to the respective second coupling portions 1223.

In the embodiment, total four support members 1220 may be provided and may be radially arranged about the center of the housing 1140, and each support member 1220 may include two first fixing portions 1221. As such, the lens moving apparatus of the embodiment may include total eight first fixing portions 1221.

In addition, the first coupling portion 1222 and the first connection portion 1224 may be arranged on the rim of the support member 1220, and a pair of elastic-deformation portions 1225 may be located between a pair of first coupling portions 1222 and a pair of first connection portions 1224.

In the embodiment illustrated in FIGS. 25 and 26, because the two first fixing portions 1221 are spaced apart from each other in the lateral direction of the support member 1220, it is possible to more effectively restrict the tilting of the housing 1140 and the bobbin 1110 compared to the case where one fixing portion is provided.

In addition, as described above, the bond for the fixing or coupling of the first fixing portion 1221 and the housing 1140 may serve as a damper. In the embodiment illustrated in FIGS. 25 and 26, the support member 1220 may be provided with a pair of bonds, in the same manner as the first fixing portions 1221.

Accordingly, compared to the case where one bond is provided, in the embodiment illustrated in FIGS. 25 and 26, the bonds may more effectively alleviate vibrations generated when the housing 1140 and the bobbin 1110 move in the second direction and the third direction.

Figure 27:
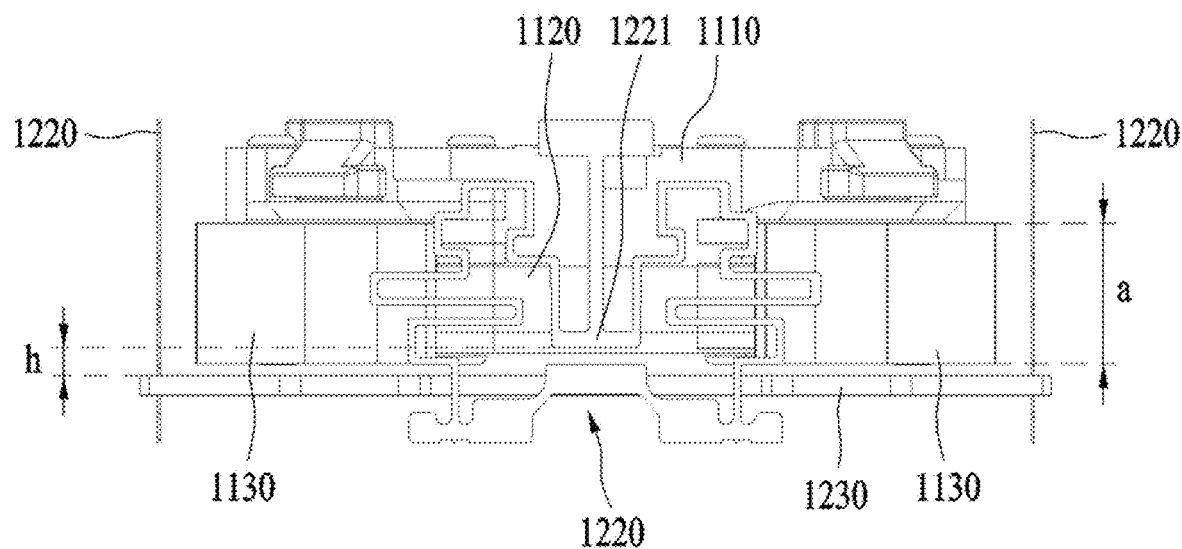
FIG. 27 is a front view illustrating a portion of the lens moving apparatus according to the embodiment.

FIG. 27 is a front view illustrating a portion of the lens moving apparatus according to the embodiment. In the embodiment, the first magnet 1130 may be located so as to be opposite to the curved portion of the side surface, i.e. the corner of the housing 1140, and the support member 1220 may be disposed so as to be opposite to the flat portion of the side surface, i.e. the straight surface of the housing 1140.

In addition, a plurality of first magnets 1130 may be provided, and may be radially arranged about the center of the housing 1140.

Referring to FIGS. 21 and 27, in the embodiment, total four first magnets 1130 may be provided, and may be arranged in a trapezoidal shape so as to be opposite to the corners of the housing 1140.

Meanwhile, a plurality of support members 1220 may be provided, and may be radially arranged about the center of the housing 1140 so as to be located between the first magnets 1130.

Referring to FIGS. 21 and 27, in the embodiment, total four support members 1220 may be provided, and may generally have a plate shape. Meanwhile, although the detailed configuration of the support members 1220 is disclosed in several embodiments, the disclosure is not limited thereto, and the support members 1220 may be provided in various forms, which may be derived from the embodiments.

In the embodiment, because the plate-shaped support member 1220 is used, it is possible to effectively restrict the tilting of the housing 1140 and the bobbin 1110 by appropriately adjusting the spring constant and reducing the distance L (see FIG. 23).

Meanwhile, for example, when a wire-shaped support member 1220 is used, it is necessary to reduce the length of the wire in order to reduce the distance L. In this case, when the spring constant of the support member 1220 is increased, it may be difficult to again reduce the spring constant.

Therefore, in the lens moving apparatus of the embodiment, using the plate-shaped support member 1220 may be more appropriate than using the wire-shaped support member 1220.

Referring to FIG. 27, in the embodiment, the first distance h, which is the distance in the first direction from the upper surface of the second coil 1230 to the lower end of the first fixing portion 1221, may be smaller than the first length a, which is the length of the first magnet 1130 in the first direction.

Appropriately, the first distance h may be approximately a half of the first length a. The range, to which electromagnetic force between the first magnet 1130 and the second coil 1230, which is used for hand tremor compensation by the lens moving apparatus, is affected, may be greatly affected by the length of the first magnet 1130 in the first direction, i.e. by the first length a.

In addition, because the lens moving apparatus performs auto-focusing simultaneously with hand tremor compensation, the housing 1140 and the bobbin 1110 may be operated by electromagnetic force between the first magnet 1130, the first coil 1120, and the second coil 1230.

Accordingly, when the first fixing portion 1221 is located close to the region to which the strongest electromagnetic force between the first magnet 1130, the first coil 1120 and the second coil 1230 is applied, the location at which the electromagnetic force is applied and the position of the first fixing portion 1221 in the first direction somewhat coincide with each other. Thereby, it is possible to reduce the degree of tilting of the housing 1140 and the bobbin 1110 compared to the case where the strongest electromagnetic force is applied to the upper side or the lower side of the first fixing portion 1221.

Accordingly, the first fixing portion 1221 may be appropriately located so that the first distance h, at which the strongest electromagnetic force between the first magnet 1130, the first coil 1120 and the second coil 1230 is accomplished, is approximately a half of the first length a.

Specifically, the first distance h may be appropriately designed to the range from 0.25 times to 0.75 times the first length a.

In the embodiment, the support member 1220 may restrict the tilting of the housing 1140 and the bobbin 1110 by providing the first fixing portion 1221 fixed to the lower portion of the side surface of the housing 1140.

In addition, it is possible to restrict the tilting of the housing 1140 and the bobbin 1110 by reducing the length of the support member 1220 in the first direction along the center axis through the use of the first fixing portion 1221.

In addition, restricting the occurrence of tilting upon hand tremor compensation of the lens moving apparatus may consequently reduce defective products.

In addition, in the embodiment, through the use of the plate-shaped support member 1220 having a configuration capable of adjusting the spring constant, the occurrence of tilting may be inhibited and the distance between the respective fixing locations of the support member 1220 may be reduced, which may ensure appropriate adjustment of the spring constant, and consequently, efficient hand tremor compensation by the lens moving apparatus.

Meanwhile, the lens moving apparatus according to the embodiments described above may be used in various fields, for example, a camera module. For example, the camera module may be applied to, for example, mobile appliances, such as, for example, a cellular phone.

The camera module according to the embodiment may include a lens barrel coupled to the bobbin 1110, an image sensor (not illustrated), and a circuit board 1250.

The lens barrel may be the same as the above description, and the circuit board 1250, on which the image sensor is mounted, may form the bottom surface of the camera module.

In addition, the lens barrel may include at least one sheet of lens, which transmits an image to the image sensor.

In addition, the camera module may further include an infrared-light blocking filter (not illustrated). The infrared-light blocking filter serves to inhibit infrared light from being introduced to the image sensor.

In this case, the infrared-light blocking filter may be installed on a position of the base 1210 illustrated in FIG. 21, which corresponds to the image sensor, and may be coupled to a holder member (not illustrated). In addition, the holder member may support the lower side of the base 1210.

A separate terminal member for electrical conduction with the circuit board 1250 may be installed on the base 1210, and a terminal may be integrally formed using, for example, a surface electrode.

Meanwhile, the base 1210 may function as a sensor holder that protects the image sensor. In this case, a protrusion may be formed on the side surface of the base 1210 so as to protrude downward. However, the protrusion may not be necessary, and although not illustrated, a separate sensor holder may be located below the base 1210.

Figure 28:
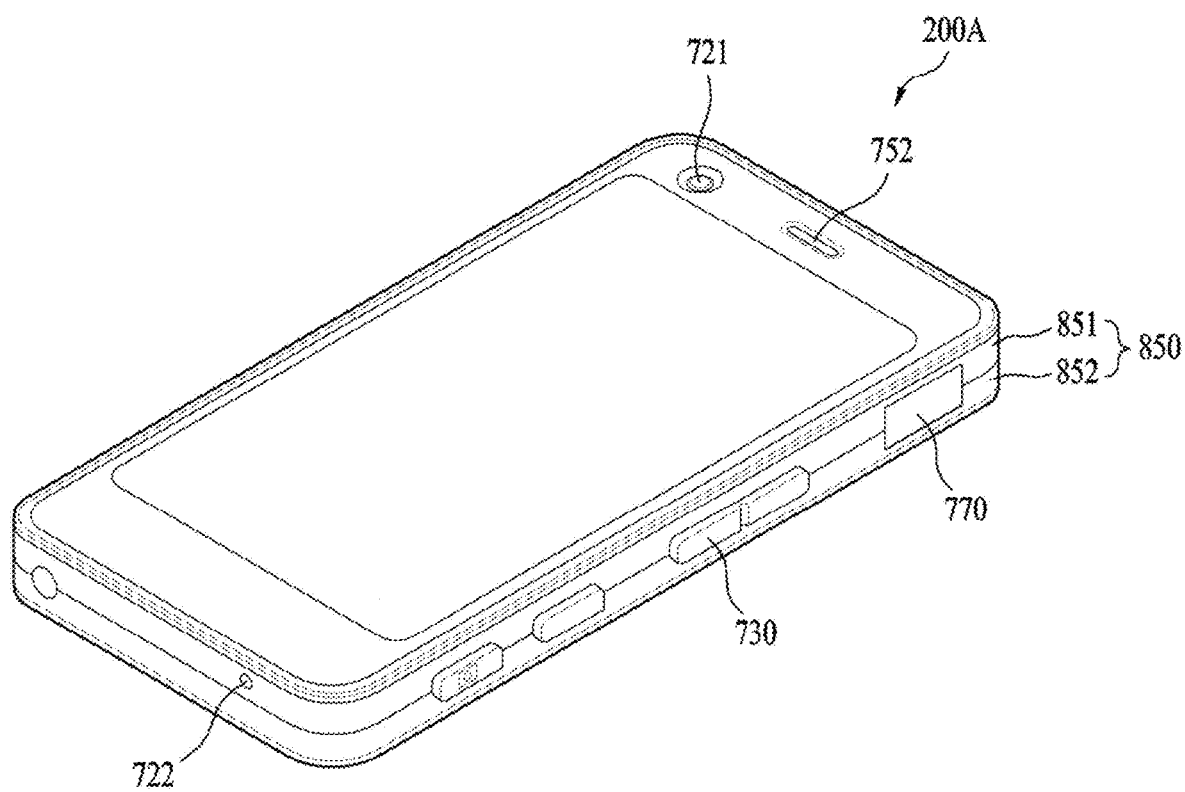
FIG. 28 is a perspective view illustrating a mobile device according to an embodiment.
Figure 29:
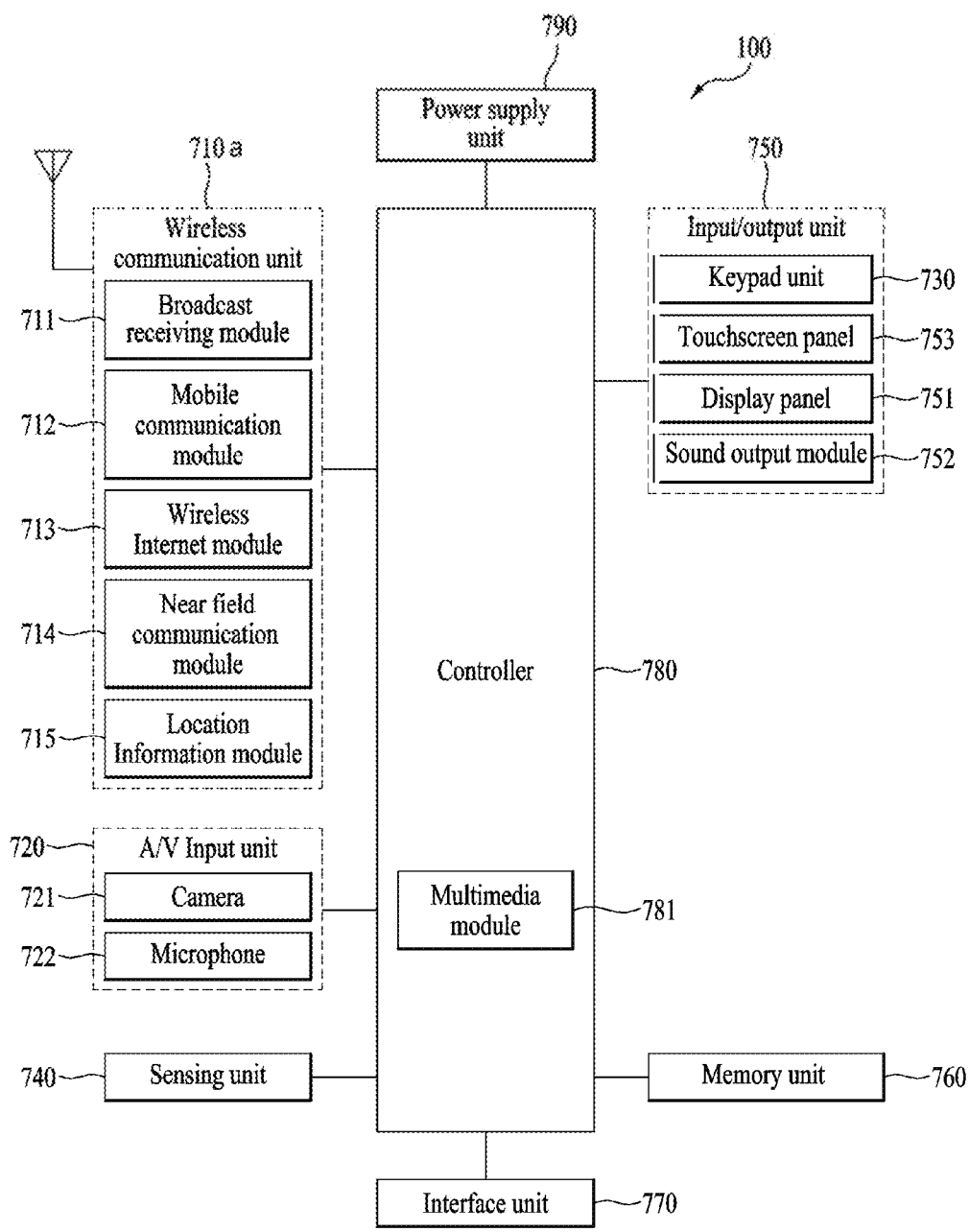
FIG. 29 is a view illustrating the configuration of the mobile device illustrated in FIG. 28.

FIG. 28 is a perspective view illustrating a mobile device 200A according to an embodiment, and FIG. 29 is a view illustrating the configuration of the mobile device illustrated in FIG. 28.

Referring to FIGS. 28 and 29, the mobile device 200A (hereinafter referred to as a "terminal") may include a body 850, a wireless communication unit 710, an A/V input unit 720, a sensing unit 740, an input/output unit 750, a memory unit 760, an interface unit 770, a controller 780, and a power supply unit 790.

The body 850 illustrated in FIG. 28 has a bar shape, without being limited thereto, and may be any of various types such as, for example, a slide type, a folder type, a swing type, or a swivel type in which two or more sub-bodies are coupled so as to be movable relative to each other.

The body 850 may include a case (e.g. casing, housing, or cover) defining the external appearance of the terminal. For example, the body 850 may be divided into a front case 851 and a rear case 852. A variety of electronic components of the terminal may be mounted in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast receiving module 711, a mobile communication module 712, a wireless Internet module 713, a near field communication module 714, and a location information module 715.

The A/V input unit 720 serves to input audio signals or video signals, and may include, for example, a camera 721 and a microphone 722.

The camera 721 may be the camera 200 including the lens moving apparatus 100 according to the embodiment illustrated in FIG. 14.

The sensing unit 740 may sense the current state of the terminal 200A such as, for example, the opening or closing of the terminal 200A, the location of the terminal 200A, the presence of user touch, the orientation of the terminal 200A, or the acceleration/deceleration of the terminal 200A, and may generate a sensing signal to control the operation of the terminal 200A. For example, when the terminal 200A is a slide type phone, the sensing unit 740 may sense whether the slide type phone is opened or closed. In addition, the sensing unit 740 serves to sense, for example, whether power is supplied from the power supply unit 790, or whether the interface unit 770 is coupled to an external appliance.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals. For example, the display module 751 may include at least one of a liquid crystal display, thin film transistor liquid crystal display, organic light emitting diode display, flexible display and 3D display.

The sound output module 752 may output audio data received from the wireless communication unit 710a in, for example, a call signal receiving mode, a call mode, a recording mode, a voice recognition mode, or a broadcast receiving mode, or may output audio data stored in the memory unit 760.

The touchscreen panel 753 may convert variation in capacitance, caused by a user touch to a specific touchscreen region, into electrical input signals.

The memory unit 760 may store programs for the processing and control of the controller 780, and may temporarily store input/output data (e.g. a phone book, messages, audio, still images, pictures, and moving images). For example, the memory unit 760 may store images captured by the camera 721, for example, pictures or moving images.

The interface unit 770 serves as a passage for connection between the terminal 200A and an external appliance. The interface unit 770 may receive power or data from the external appliance and transmit the same to respective constituent elements inside the terminal 200A, or may transmit data inside the terminal 200A to the external appliance. For example, the interface unit 770 may include, for example, a wired/wireless headset port, external charger port, wired/wireless data port, memory card port, port for connection of a device having an identification module, an audio input/output (I/O) port, a video I/O port, and an earphone port.

The controller 780 may control the general operation of the terminal 200A. For example, the controller 780 may perform control and processing related to, for example, voice call, data communication, and video call. The controller 780 may include a panel controller of a touchscreen panel drive unit or may perform the function of the panel controller.

The controller 780 may include a multimedia module 781 for the playback of a multimedia. The multimedia module 781 may be provided inside the controller 780, or may be provided separately from the controller 780.

The controller 780 may perform pattern recognition processing by which writing input or drawing input to a touchscreen is perceivable as characters and images respectively.

The power supply unit 790 may supply power required to operate the respective constituent elements upon receiving external power or internal power under the control of the controller 780.

As is apparent from the above description, the embodiments have the effects of increasing the reliability of OIS control and restricting the effect of magnetic induction by a coil. In the embodiment, a support member includes a first fixing portion fixed to the lower portion of the side surface of a housing, thereby being capable of restricting the tilting of the housing and a bobbin. In addition, through the provision of the first fixing portion, the center axis length of the support member in the first direction may be reduced, which may restrict the tilting of the housing and the bobbin.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A camera module comprising:
   a lens moving device;
   a first circuit board electrically connected to the lens moving device;
   an image sensor disposed on the first circuit board; and
   a first capacitor disposed on the first circuit board;
   wherein the lens moving device comprises:
   a housing;
   a bobbin disposed in the housing;
   an elastic member coupled to the bobbin;
   a first coil disposed on the bobbin;
   a first magnet disposed on the housing;
   a second coil facing the first magnet;
   a second circuit board disposed below the housing and including a first terminal, a second terminal, a third terminal, and fourth terminal; and
   a first sensor disposed on the second circuit board and including first and second input terminals connected to the first and second terminals for receiving a first input signal from the second circuit board and first and second output terminals connected to the third and fourth terminals for outputting a first output signal to the second circuit board,
   wherein the first capacitor is connected in parallel to the first and second output terminals of the second circuit board.

2. The camera module according to claim 1, comprising:
   a second sensor disposed on the second circuit board and including third and fourth input terminals for receiving a second input signal from the first circuit board and third and fourth output terminals for outputting a second output signal to the first circuit board; and
   a second capacitor disposed on the first circuit board and connected in parallel to the third and fourth output terminals of the second sensor.

3. The camera module according to claim 2, wherein each of the first and second sensors is configured to be Hall sensor.

4. The camera module according to claim 2, comprising a base disposed below the second circuit board, and
   wherein the first and second sensors are located between a lower surface of the second circuit board and an upper surface of the base.

5. The camera module according to claim 4, wherein the base has a first recess configured to receive the first sensor and a second recess configured to receive the second sensor.

6. The camera module according to claim 2, wherein each of the first and second capacitors is mounted on the first circuit board in a chip form.

7. The camera module according to claim 2, wherein the second coil comprises:
   first and second coil units disposed on an upper surface of the second circuit board and facing each other in an X-axis direction; and
   third and fourth coil units disposed on the upper surface of the second circuit board and facing each other in a Y-axis direction;
   wherein the first magnet comprises four magnets corresponding to the first, second, third, and fourth coil units, respectively.

8. The camera module according to claim 7, wherein the first to fourth coil units are configured to be included in a circuit board disposed on the second circuit board.

9. The camera module according to claim 2, wherein the elastic member comprises:
   an upper elastic member coupled to an upper portion of the bobbin and an upper portion of the housing; and
   a lower elastic member coupled to a lower portion of the bobbin and a lower portion of the housing.

10. The camera module according to claim 9, wherein the upper elastic member comprises:
    an inner frame coupled to the upper portion of the bobbin;
    an outer frame coupled to the upper portion of the housing; and
    a connection portion connecting the inner frame and the outer frame.

11. The camera module according to claim 9, comprising a support member disposed on a side portion of the housing and electrically connected to the upper elastic member.

12. The camera module according to claim 11, comprising:
    a second magnet disposed on the bobbin; and
    a third sensor disposed on the housing and configured to detect variation in strength of magnetic force of the second magnet.

13. The camera module according to claim 12, further comprising a compensation magnet disposed on the bobbin at a position symmetrical to the second magnet.

14. The camera module according to claim 2, wherein the second coil is disposed above the second circuit board, and
    wherein the first and second sensors are disposed under the second circuit board.

15. The camera module according to claim 1, wherein the first sensor is configured to sense variation in strength of a first magnetic field of the first magnet and output the first output signal to the first and second output terminals based on a sensed result of the first magnetic field strength of the first magnet.

16. The camera module according to claim 1, comprising a controller electrically connected to the first and second sensors and receiving the first and second output signals of the first and second sensors.

17. The camera module according to claim 16, wherein the controller comprises a first amplifier that amplifies the first output signal of the first sensor and a second amplifier that amplifies the second output signal of the second sensor,
    wherein the first amplifier comprises a first input terminal connected to one end of the first capacitor and a second input terminal connected to an other end of the first capacitor, and
    wherein the second amplifier comprises a first input terminal connected to one end of the second capacitor and a second input terminal connected to an other end of the second capacitor.

18. The camera module according to claim 17, wherein the first and second output terminals of the first sensor, both the ends of the first capacitor, and the first and second input terminals of the first amplifier are connected in parallel to one another, and
    wherein first and second output terminals of the second sensor, both ends of the second capacitor, and the first and second input terminals of the second amplifier are connected in parallel to one another.

19. A mobile device comprising:
    a display module including a plurality of pixels, a color of which varies by an electrical signal;
    the camera module according to claim 1; and
    a controller configured to control operations of the display module and the camera module.

20. A camera module comprising:
a lens moving device;
a first circuit board electrically connected to the lens moving device;
an image sensor disposed on the first circuit board;
a first capacitor disposed on the first circuit board; and
a second capacitor disposed on the circuit board;
wherein the lens moving device comprises:
a housing;
a bobbin disposed in the housing;
an elastic member coupled to the bobbin;
a first coil disposed on the bobbin;
a first magnet disposed on the housing;
a second coil facing the first magnet;
a second circuit board disposed below the housing;
a base disposed below the second circuit board;
a first sensor disposed on the second circuit board and including first and second input terminals for receiving a first input signal from the second circuit board and first and second output terminals for outputting a first output signal to the second circuit board; and
a second sensor disposed on the second circuit board and including third and fourth input terminals for receiving a second input signal from the second circuit board and third and fourth output terminals for outputting a second output signal to the second circuit board,
wherein the first capacitor is connected in parallel to the first and second output terminals of the first sensor, and
wherein the second capacitor is connected in parallel to the third and fourth output terminals of the second sensor.

* * * * *